(12) United States Patent
Chen et al.

(10) Patent No.: US 11,128,161 B2
(45) Date of Patent: Sep. 21, 2021

(54) HYBRID BATTERY CHARGER

(71) Applicant: Schumacher Electric Corp., Mount Prospect, IL (US)

(72) Inventors: Xiao Ping Chen, Buffalo Grove, IL (US); Matthew Adam Heins, Arlington Heights, IL (US); Shenzhong Zhu, Des Plaines, IL (US)

(73) Assignee: Schumacher Electric Corporation, Mt. Prospect, IL (US)

( * ) Notice: Subject to any disclaimer, the term of this patent is extended or adjusted under 35 U.S.C. 154(b) by 421 days.

(21) Appl. No.: 15/461,619

(22) Filed: Mar. 17, 2017

(65) Prior Publication Data

US 2017/0210234 A1    Jul. 27, 2017

Related U.S. Application Data

(63) Continuation of application No. 15/153,164, filed on May 12, 2016, now Pat. No. 9,643,503, which is a
(Continued)

(51) Int. Cl.
*B60L 11/18* (2006.01)
*H01F 38/42* (2006.01)
(Continued)

(52) U.S. Cl.
CPC .............. *H02J 7/02* (2013.01); *B60L 11/1809* (2013.01); *B60L 53/00* (2019.02); *B60L 58/15* (2019.02);
(Continued)

(58) Field of Classification Search
CPC .. B60L 11/1809; B60L 11/1861; B60L 11/18; H02J 7/0029; H02J 7/00;
(Continued)

(56) References Cited

U.S. PATENT DOCUMENTS

| 5,166,595 A | * | 11/1992 | Leverich ................. H02J 7/008 |
| | | | 320/139 |
| 6,274,949 B1 | | 8/2001 | Lioux et al. |

(Continued)

FOREIGN PATENT DOCUMENTS

| CA | 2742453 A1 * | 12/2011 | ............... H02J 7/35 |
| CN | 101222180 | 7/2008 | |

(Continued)

OTHER PUBLICATIONS

International Search Report for PCT Application No. PCT/US2013/066111 dated May 7, 2014.
(Continued)

*Primary Examiner* — Richard Isla
*Assistant Examiner* — Dung V Bui
(74) *Attorney, Agent, or Firm* — Michael Stanley Tomsa; McAndrews, Held & Malloy, Ltd.

(57) ABSTRACT

A hybrid battery charger is disclosed that includes a linear charger circuit for providing vehicle starting current and battery charging and a high frequency battery charging circuit that provides battery charging current. The linear charger circuit and the high frequency battery charging circuits are selectively enabled to provide vehicle starting current, maximum charging current and optimum efficiency.

21 Claims, 26 Drawing Sheets

Related U.S. Application Data continuation of application No. 13/659,412, filed on Oct. 24, 2012, now Pat. No. 9,368,269.

(51) Int. Cl.

| | | |
|---|---|---|
| *H02J 7/04* | (2006.01) | |
| *H02J 7/00* | (2006.01) | |
| *H02J 7/02* | (2016.01) | |
| *H01F 27/28* | (2006.01) | |
| *B60L 53/00* | (2019.01) | |
| *B60L 58/15* | (2019.01) | |

(52) U.S. Cl.
CPC ............ *H01F 27/28* (2013.01); *H01F 38/42* (2013.01); *H02J 7/0029* (2013.01); *H02J 7/022* (2013.01); *H02J 7/045* (2013.01); *H02J 7/00302* (2020.01)

(58) Field of Classification Search
CPC ...... H02J 7/02; H02J 7/04; H02J 7/022; H02J 7/045; H02J 7/0052; H02J 2007/0037; H01F 27/28; H01F 38/42
USPC .......................................................... 320/107
See application file for complete search history.

(56) References Cited

U.S. PATENT DOCUMENTS

| | | | |
|---|---|---|---|
| 6,822,425 B2 | 11/2004 | Krieger et al. | |
| 6,859,091 B1* | 2/2005 | Nicholson | H02M 3/07 327/536 |
| 7,460,966 B1 | 12/2008 | Hattori | |
| 7,498,769 B1 | 3/2009 | Potanin et al. | |
| 7,528,579 B2* | 5/2009 | Pacholok | H02J 7/022 320/145 |
| 7,808,211 B2 | 10/2010 | Pacholok et al. | |
| 8,188,708 B2 | 5/2012 | Altekruse et al. | |
| 8,193,780 B2* | 6/2012 | Hussain | H02J 7/0071 320/164 |
| 9,368,269 B2* | 6/2016 | Chen | H01F 27/28 |
| 9,643,503 B2* | 5/2017 | Chen | H01F 27/28 |
| 2003/0141845 A1 | 7/2003 | Krieger et al. | |
| 2005/0083016 A1* | 4/2005 | Yau | H02J 7/0018 320/116 |
| 2005/0088144 A1* | 4/2005 | Pacholok | H02J 7/022 320/131 |
| 2007/0029975 A1* | 2/2007 | Martin | H02J 7/0068 320/134 |
| 2007/0114970 A1 | 5/2007 | Johnson et al. | |
| 2008/0186004 A1* | 8/2008 | Williams | H02M 3/156 323/282 |
| 2008/0258686 A1* | 10/2008 | Li | H02J 7/00 320/134 |
| 2008/0258687 A1* | 10/2008 | So | H02J 7/00 320/145 |
| 2008/0304293 A1 | 12/2008 | Spiridon et al. | |
| 2009/0066290 A1* | 3/2009 | Altekruse | H02J 7/0029 320/108 |
| 2009/0218990 A1 | 9/2009 | Johnson et al. | |
| 2009/0243548 A1 | 10/2009 | Hoff | |
| 2010/0123443 A1 | 5/2010 | Grimm | |
| 2010/0194348 A1* | 8/2010 | Wang | H01M 10/42 320/136 |
| 2011/0006728 A1* | 1/2011 | Kung | H02M 3/158 320/107 |
| 2011/0169448 A1* | 7/2011 | Ichikawa | B60K 6/445 320/109 |
| 2011/0285210 A1 | 11/2011 | Lemmens et al. | |
| 2012/0038324 A1* | 2/2012 | Humphrey | B60L 3/0084 320/138 |
| 2012/0091970 A1* | 4/2012 | Cho | H02M 1/4225 320/160 |
| 2012/0306437 A1* | 12/2012 | Johnson | H02J 7/00 320/107 |
| 2013/0077350 A1* | 3/2013 | Mao | H02M 3/33523 363/16 |
| 2013/0127358 A1 | 5/2013 | Yao | |
| 2014/0111139 A1 | 4/2014 | Chen et al. | |

FOREIGN PATENT DOCUMENTS

| | | |
|---|---|---|
| CN | 101253667 | 8/2008 |
| CN | 202309120 | 7/2012 |

OTHER PUBLICATIONS

International Preliminary Report on Patentability and Written Opinion for PCT Application No. PCT/US2013/066111 dated May 7, 2015.

European Search Report on European Patent Application No. EP 13 84 9377, dated Apr. 12, 2016.

Supplementary European Search Report, 13849377.0, dated Aug. 10, 2016.

Office Action for PRC (China) Patent Application No. 201380055062.6, dated Jan. 20, 2017.

Office Action for PRC (China) Patent Application No. 201380055062.6, dated Aug. 30, 2017 (English translation).

* cited by examiner

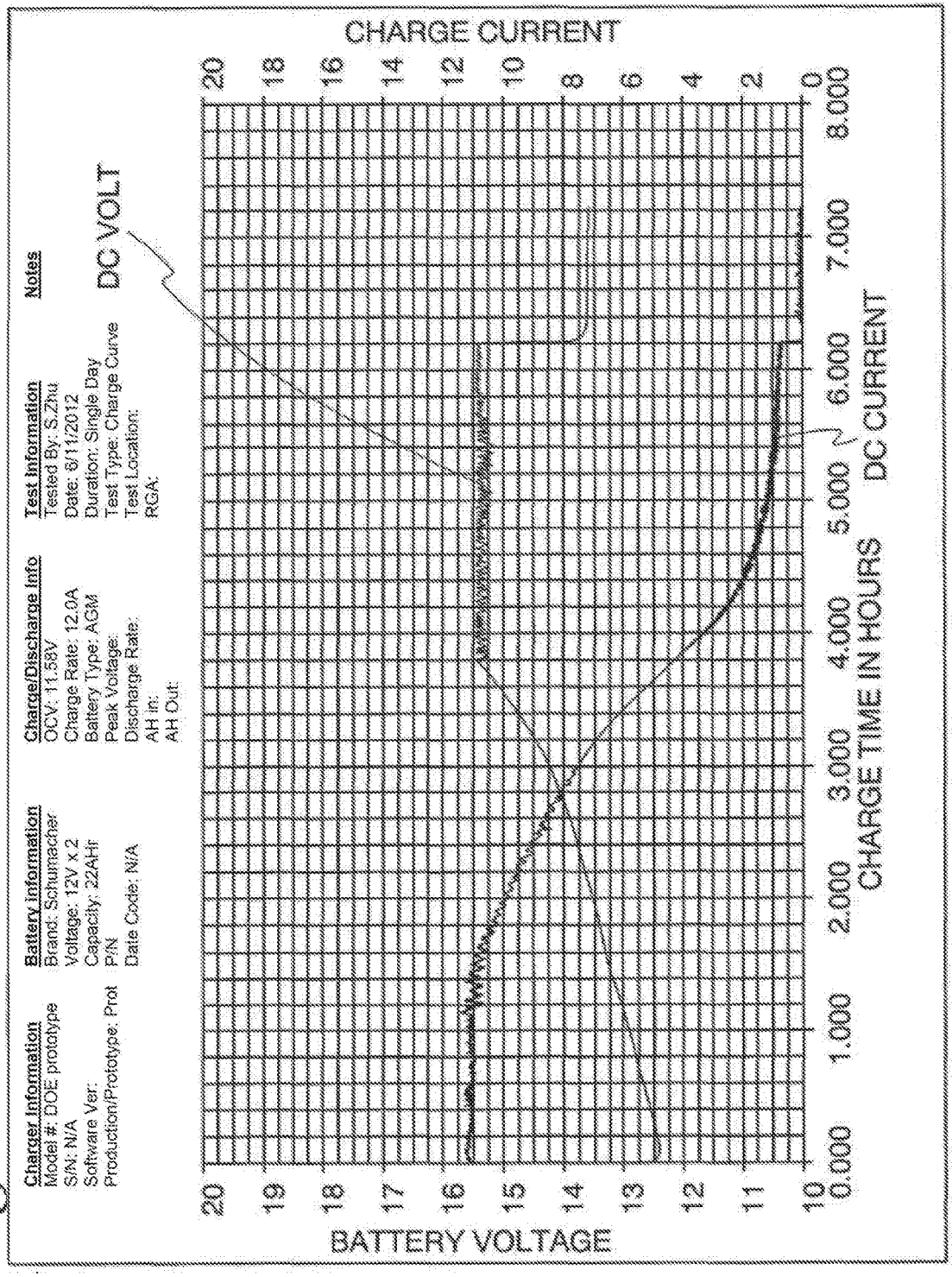

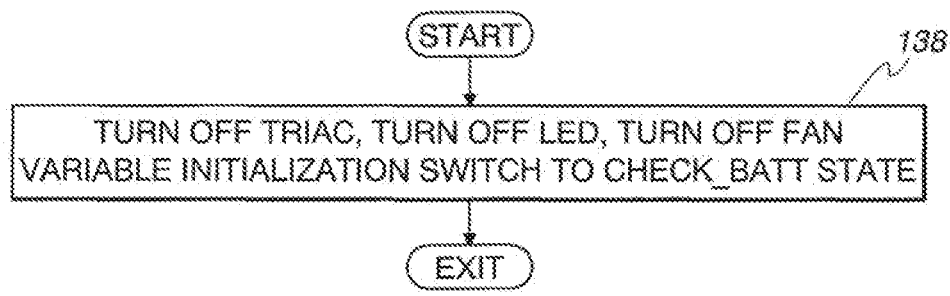
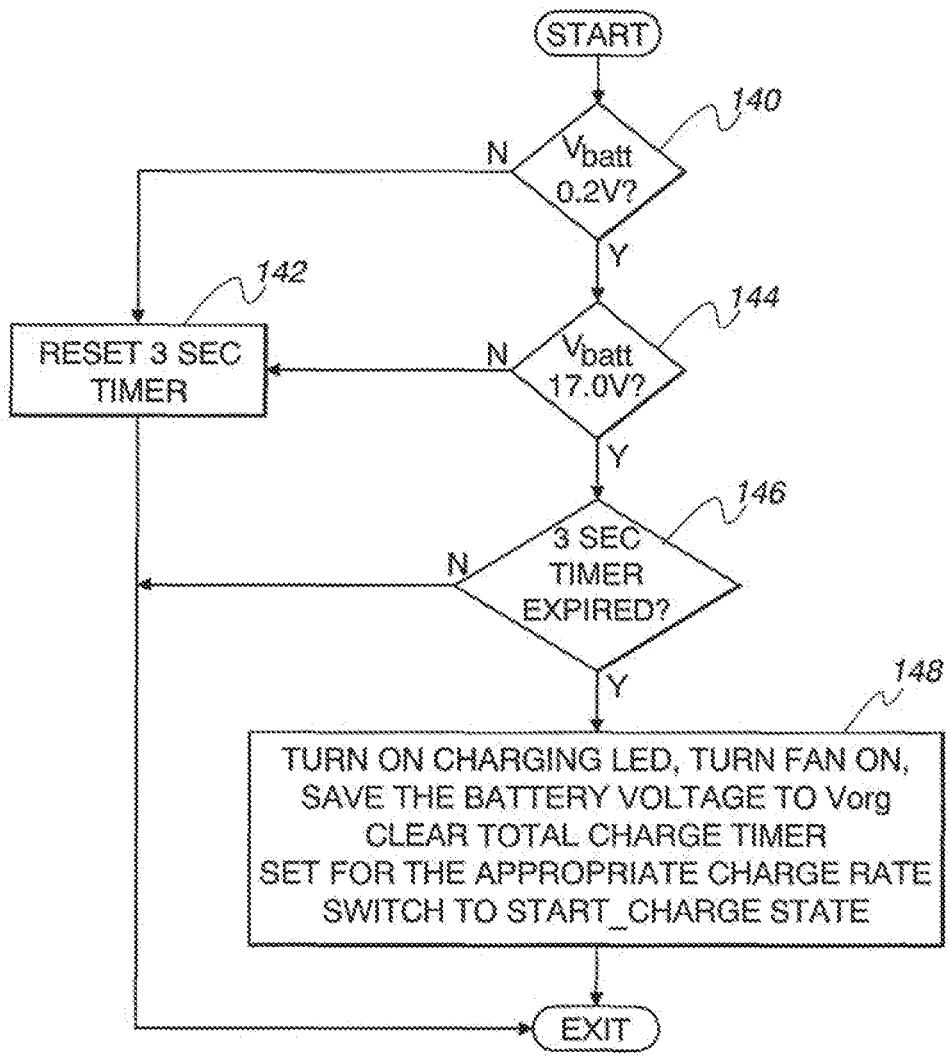

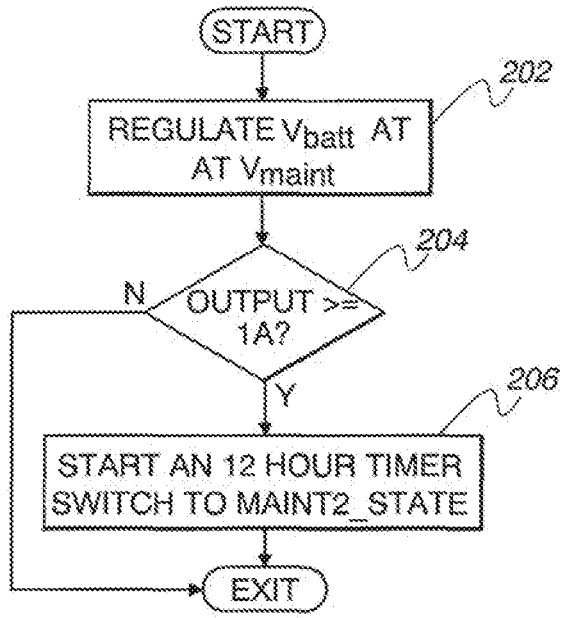
Fig. 7G CHARGE HANDLER - MAINT_STATE
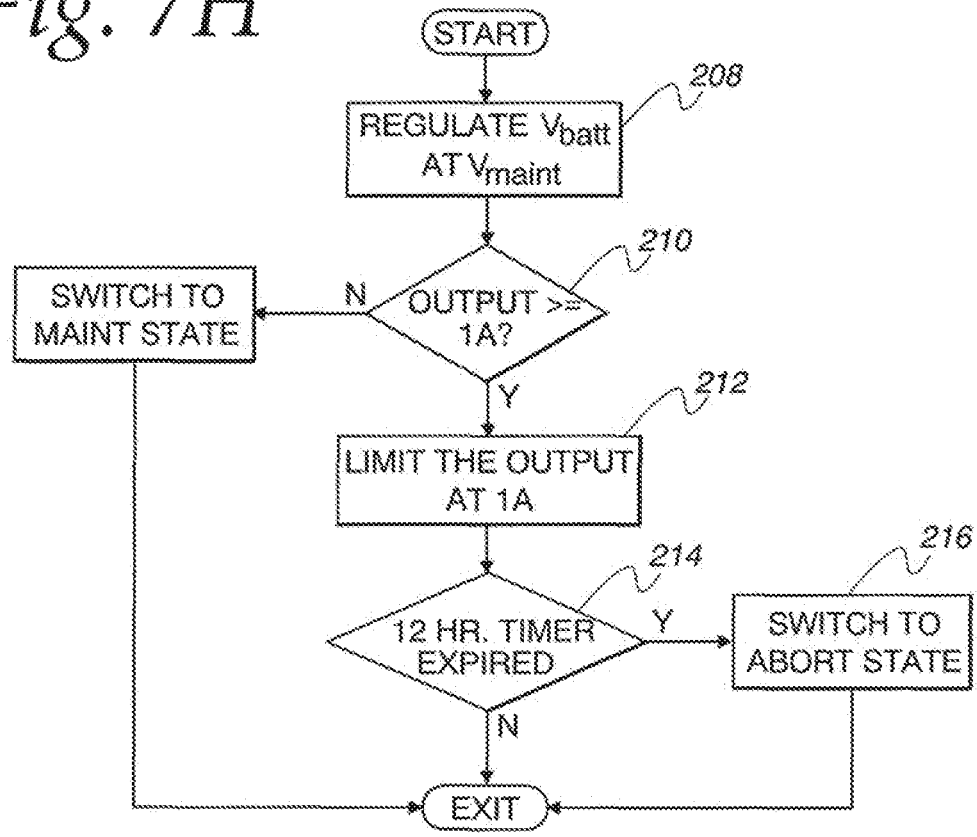
Fig. 7H CHARGE HANDLER - MAINT2_STATE

HYBRID BATTERY CHARGER

RELATED APPLICATIONS

This application is a continuation of U.S. patent application Ser. No. 15/153,164, filed on May 12, 2016, which is a continuation of U.S. Pat. No. 9,368,269, filed on Oct. 24, 2012, each by Xiao Ping Chen et al. and entitled "Hybrid Battery Charger." U.S. patent application Ser. No. 15/153, 164 and U.S. Pat. No. 9,368,269 are hereby incorporated by reference in their entirety.

TECHNICAL FIELD

The present invention relates to a battery charger and more particularly to a hybrid battery charger that includes a linear charger circuit for providing vehicle starting current and battery charging during predetermined conditions and a high frequency battery charging circuit for providing battery charging current during different predetermined conditions; the linear charger circuit and the high frequency battery charging circuits being selectively enabled to provide vehicle starting current, maximum charging current, and optimum efficiency.

BACKGROUND

Various types of battery charger circuits are known in the art. For example, the two most common types of battery charger circuits are linear and high frequency (also known as switched mode) battery charger circuits. Both types of battery charger circuits are known to have advantages and disadvantages.

Linear charger circuits normally include a transformer, a rectifier and a current regulating element. The primary of the transformer is normally connected to an external 120 volt AC power supply. The transformer steps down the voltage from the 120 volt AC power supply to an appropriate voltage for charging a battery, for example 12 volts AC. A rectifier, such as, a full wave rectifier, converts the stepped down AC voltage on the secondary winding of the transformer to a DC charging voltage. In some known linear charger circuits, a passive linear element, such as a resistor, is connected in series with the secondary winding of the transformer to limit the charging current provided to the battery. Linear charger circuits may also include a voltage regulator between the passive element and the secondary winding of the transformer to stabilize the output voltage. The charging current of such linear charger circuits is a linear function of the voltage of the 120 volt AC power supply source.

High frequency charger circuits are also known. An exemplary high frequency transformer is described in detail in U.S. Pat. No. 6,822,425, hereby incorporated by reference. In general, such high frequency charger circuits normally are connected to an external 120 volt AC power supply. The 120 volts AC from the 120 volt AC power supply is rectified, for example, by a full wave rectifier, to generate a DC voltage. The DC voltage is switched on and off by electronic switching circuitry to create a high frequency pulse train, for example, at frequencies from 10 KHz to 1 MHz, and applied to a high frequency transformer. The high frequency transformer steps down the voltage to an appropriate charging voltage. This charging voltage is rectified and filtered to provide the desired DC charging voltage for the battery to be charged.

Regulations governing battery charger efficiencies have been promulgated by various governmental agencies. For example, the California Energy Commission has revised their Appliance Efficiency Regulations to include battery charger circuits. These regulations are set forth in Title 20, Sections 1601-1608 of the California Code of Regulations ("Regulations"). The US Department of Energy has also promulgated standards regarding the efficiency of battery chargers in Title 10, Part 430 of the Code of Federal Regulations.

Unfortunately, many known conventional linear battery charger and conventional high frequency battery chargers are not known to meet the battery charger efficiency benchmarks set forth in the standards mentioned above. Specifically, known linear charger circuits are known to have efficiency in the range from 50% to 75% at full load, which is below the benchmarks set forth in the standards mentioned above. Most of the losses are known to be from the transformer.

In order to address this problem, one known linear charger circuit is known to incorporate a toroidal transformer which has significantly lower losses than bobbin wound transformers. However, there are several drawbacks with respect to the use of toroidal transformers. For example, such toroidal transformers require specialized winding equipment are more labor intensive and have efficiency in the range from 65% to 80% at full load. In addition, as is the case with most known bobbin wound transformers, the efficiency of such toroidal wound transformers is lower at less than 60% of full load. In fact, at 20% of full load, the efficiency of such toroidal wound transformers can be less than 40%.

High frequency charger circuits can be designed to be 80% to 90%+efficient at full load. However, the efficiency of such high frequency charger circuits is known to be relatively less efficient at less than full load. In addition, high frequency battery chargers are less reliable because of the number of components and the amount of current through those components in an engine start mode.

As mentioned above, the efficiencies of the linear and high frequency battery chargers vary as a function of their loading. The regulations set forth above relate to overall efficiencies. This means that the battery charger must meet the efficiency benchmarks during all conditions in which the battery charger is connected to a 120 volt AC power supply. For example, the California regulations specify that the efficiency benchmark must be maintained over a 24 hour period during the following modes of operation:

- A mode when the battery charger is charging a battery.
- A mode in which the battery charger is providing a trickle charge to the battery.
- A mode in which the battery is disconnected from the battery with the battery charger still connected to the 120 volt AC power supply.

Moreover, even though the conventional linear and high frequency battery chargers mentioned above may meet the benchmarks specified in the above mentioned regulations during certain operating conditions, such as full load, the efficiencies of such chargers are below the specified efficiency benchmark at operating conditions other than full load. Thus, there is a need for a battery charger circuit that can meet the efficiency benchmarks set forth in the above mentioned regulations.

SUMMARY OF THE INVENTION

Briefly, the present invention relates to a hybrid battery charger which includes a linear charger circuit and a high frequency charger circuit. The hybrid battery charger takes advantage of the efficiencies of each charger circuit to improve the overall efficiency of the hybrid charger. The linear charger circuit is used to provide a high output current, for example 75 amps even up to 300 amps, for vehicle starting applications and battery charging applications in which the battery charging current is relatively high and exceeds a predetermined level representative of relatively high charging current, for example, over 7 amps. When the charging current drops below the predetermined level, the linear charger circuit is switched off and the high frequency charger circuit is switched on to improve the overall efficiency of the hybrid charger. In order to further improve the efficiency of the hybrid battery charger, the frequency of the electronic switching circuitry in the high frequency battery charging circuit may be varied to further reduce losses. In accordance with an important aspect of the invention, the hybrid battery charger circuit is fully operational even at relatively low battery voltage conditions, for example, 1 volt DC.

DESCRIPTION OF THE DRAWING

These and other advantages of the present invention will be readily understood with reference to the following specification and attached drawing wherein:

FIG. 2A is an exemplary charging curve for a 12 ampere battery charger.

FIGS. 7A-7L illustrate exemplary software flow charts in accordance with the present invention.

DETAILED DESCRIPTION

Figure 1:
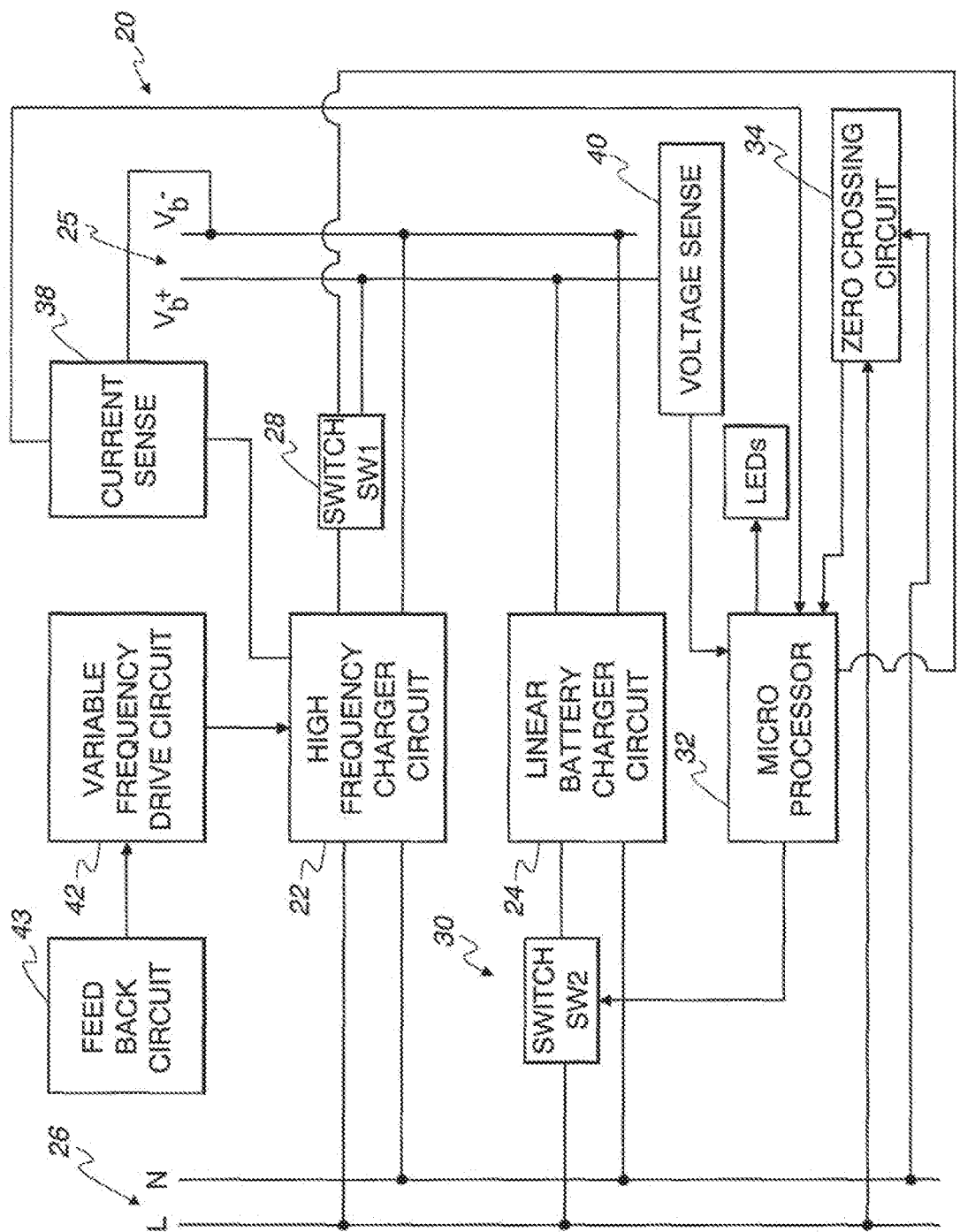
FIG. 1 is a block diagram of the hybrid battery charger in accordance with the present invention.

The present invention relates to a hybrid battery charger which includes a linear charger circuit and a high frequency charger circuit. The linear charger circuit is used when it is most efficient; namely, providing a high output current, for example 75 amps, for vehicle starting applications and applications in which the battery charging current, i.e., load current, is relatively high and exceeds a predetermined level representative of relatively high charging current, for example, over 7 amps DC. More particularly, in order to improve the overall efficiency of the hybrid battery charger, the linear charger circuit is switched off when the charging current drops below the predetermined level, and the high frequency charger circuit is switched on. Thus, the linear charger circuit and the high frequency charger circuit are each used when it is most efficient to do so during a charging cycle.

Both battery charger circuits may be connected in parallel. As such, in applications in which the required charging current exceeds the battery current charging capacity of the linear charger circuit and the high frequency charger circuit individually, both the linear charger circuit and the high frequency charger circuit are connected in parallel and can be selectively turned on together to provide a charging current equivalent to the sum of the maximum output currents of both charger circuits.

In order to further improve the efficiency of the high frequency charger circuit, a variable frequency drive circuit is used to control the on/off switching of the high frequency transformer. Typical drive circuits are normally switched at around 100 KHz. The variable frequency drive circuit allows the frequency of the switching to be controlled between 20 KHz and 100 KHz as a function of the output load conditions. In particular, during relatively low load conditions, the variable frequency drive circuit reduces the switching frequency. At lower frequencies, the switching losses and thus power losses are greatly reduced. Moreover, the variable frequency drive circuit can be configured to skip cycles at extremely low load conditions to further reduce losses. In the exemplary embodiment described and illustrated, the above mentioned improvements in efficiency enable the high frequency charger circuit to attain efficiency over 80% for most load conditions.

The linear charger circuit, used for the engine start function and battery charging, is capable of providing 10 Amps DC continuous battery charging current. The linear charger circuit may be connected in parallel with the high frequency charger circuit that can provide 2 Amps DC charging current. The net result is a hybrid charger that can provide 12 Amps DC continuous charging current.

Since the linear charger circuit is only about 75% efficient, it can only be used for a portion of the time in order for the hybrid battery charger to attain an overall efficiency over 80%. In particular, in accordance with one aspect of the invention, the linear charger circuit is only used when it is most efficient, for example, when one or more of the following conditions exist:

the charging current being drawn by the battery is above a predetermined value, for example, approximately 7 Amps DC;

the battery voltage is below a certain value, for example, 13.2 Volts DC; and the rate of change of voltage (dV/dt) is below a predetermined value, for example, approximately 0.1V/hour.

By limiting the conditions when the linear charger circuit is used, as mentioned above, the linear charger circuit is only used when it is more than 70% efficient. Using a charge time of, for example, 24 hours, as set forth by the Department of Energy in Section 430.23 of the Code of Federal Regulations, the linear charger circuit is estimated to be used for 2 hours and would average an efficiency of approximately 75%. Assuming a worst case scenario in which the high frequency charger circuit runs for an entire 24 hours, the average power used by the combination of the linear charger circuit and the high frequency battery charging circuit would meet or exceed 80% efficiency.

In order to meet the efficiency mentioned above, the hybrid battery charger may include one or more of the following features to further reduce losses and improve efficiency. These features are optional and relate to various aspects of the hybrid battery charger design.

One optional feature that may be incorporated into the hybrid battery charger in order to further reduce losses of the hybrid battery circuit relates to the linear transformer used in linear charger circuits. In particular, such linear transformers are known to dissipate power under no load conditions when connected to an external 120 volt AC power supply. In order to further improve efficiency and reduce losses, the linear charger circuit and thus the linear transformer may be disconnected from the AC power supply when not in use.

Another optional feature to improve efficiency relates to current limiting the high frequency charger circuit. By current limiting the high frequency charger circuit, the efficiency is improved by keeping the power supply from cycling between an ON condition and an OFF condition when the battery is deeply discharged.

Another optional feature to further reduce power losses by the hybrid battery charger relates to the microcontroller used to control the hybrid battery charger. In particular, the hybrid battery charger utilizes a microcontroller to control various aspects of the hybrid battery charger. For example, the microcontroller is used to make battery voltage measurements; switch the linear charger circuit in and out; control the amount of starting current provided by the linear charger circuit; and control the hybrid battery charger in accordance with a charging algorithm. In order to further reduce power losses and increase the efficiency of the hybrid battery charger, the microcontroller may optionally be put into sleep mode when the charge goes into maintenance mode. During a condition when the microcontroller is in a sleep mode, the high frequency charger circuit is configured to regulate the high frequency charger circuit output voltage to the maintenance voltage, for example, 13.5V in response to an analog signal since no signal will be available from the microcontroller during this condition. The microcontroller is set to wake under several conditions including battery disconnection.

In accordance with another important feature of the invention, the construction of the high frequency transformer enables the charger to operate normally at a battery voltage down to about one (1) Volt DC. In particular, a primary fly-back bias winding on the high frequency transformer is wound on the bobbin first in multi-strands wire to cover the full width of the bobbin in one layer, thus this bias winding works as a shielding layer to improve EMC performance. In addition, the main primary winding is wound next and in opposite winding direction to the fly-back winding. This configuration improves the EMC performance further.

The high frequency transformer in accordance with the present invention is provided with a second bias winding. One bias winding is connected in the traditional fly-back configuration, i.e., connected with the opposite polarity as the primary winding, and the other bias winding is connected with the same polarity in a forward direction. The reason this is done is to allow the bias winding to supply voltage to run the microcontroller and the PWM controller even if the load, i.e., battery voltage, is very low. The voltage of the fly-back bias winding is proportional to the battery voltage which is supplied by the output fly-back winding. Thus, when battery voltage is very low (generally known as an over-discharged state, which may be 1 volt DC), the microcontroller and PWM controller, which are powered by the fly-back windings, will not operate correctly if those controllers are only powered by the fly-back bias windings, which are now very low due to the low battery voltage. With help of the forward bias windings, which are in opposite polarity to the fly-back bias windings, those forward bias windings then supply power to the microcontroller and the PWM controller to keep them operating correctly.

Exemplary Block Diagram.

Turning to FIG. 1, a block diagram of the hybrid battery charger in accordance with the present invention is illustrated. The hybrid battery charger is generally identified with the reference numeral 20. The hybrid battery charger 20 includes a high frequency charger circuit 22 and a linear charger circuit 24. The high frequency charger circuit 22 is selectively connected to the output terminals $Vb^+$ and $Vb^-$, generally identified with the reference numeral 25, by way of a switch SW1 28. The linear charger circuit 24 is selectively connected to an external source of 120 volts AC power supply 26 by way of a switch SW2 30. Both battery charging circuits may be connected in parallel. In applications in which the charging current exceeds the charging capacity of the linear charger circuit, both the linear charger circuit and the high frequency charger circuit may be turned on simultaneously to provide a charging current equivalent to the sum of the two charging circuits. More particularly, the switch SW1 28 allows the high frequency charger circuit 22 to be selectively connected to the output terminals 25 under the control of a microcontroller 32, Similarly, the switch SW2 30 allows the linear charger circuit 24 to be selectively connected to the 120 volt AC power supply 26 under the control of the microcontroller 32.

The switches SW1 28 and SW2 30 allow the hybrid battery charger 20 to have 4 modes of operation. In a first or starting mode of operation, the hybrid battery charger 20 operates to provide starting current, for example, 75 amps DC. In this mode of operation, the switch SW1 28 is open to disconnect the high frequency charger circuit 22 from the output terminals 25. In this mode, the microcontroller 32 monitors the zero crossings of the external source of 120 volt AC power. Depending on the level of starting current required, the microcontroller 32 will signal the switch SW2 30 to close to deliver the required starting current. For example, with reference to FIG. 5, the nominal peak voltage of the external source of 120 volts AC. As will be discussed in more detail below, this voltage is applied to a step down transformer and rectified to provide a DC starting current and a DC charging current. Assuming a step down transformer with a turn ratio of 10:1, the voltage will be reduced by a factor of 10 and the current will be increased by a factor of 10. Assuming the external supply of 120 volts AC can supply 7.5 amps of AC current, using the above example, the linear charger circuit 24 is able to provide 75 amps DC starting current.

Figure 6:
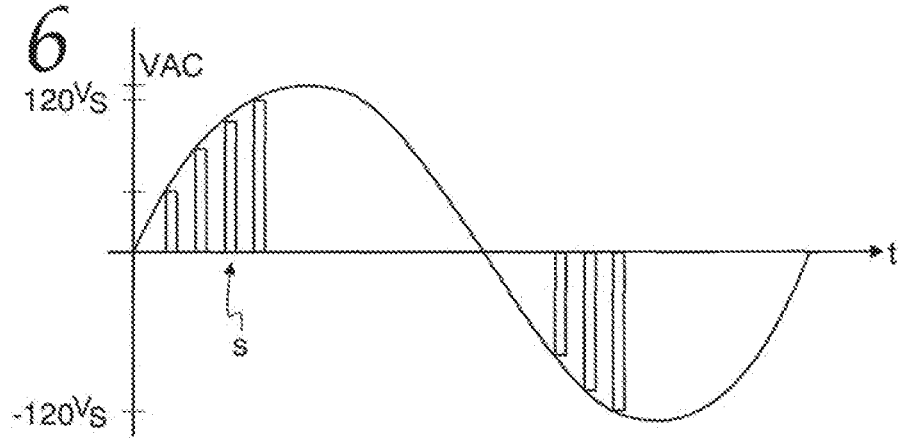
FIG. 6 is an exemplary diagram illustrating the switching of a triac, or alternatively a pair of SCRs, used to control the magnitude of the voltage from a 120 volt AC power supply that is connected to the linear charger circuit.

In the starting mode of operation, the linear charger circuit 24 is used to provide starting current. In this mode, the microcontroller 32 senses the zero crossings of the external source of 120 volts AC by way of a zero crossing detector 34. Knowing the zero crossings and the frequency of the external source of 120 volts AC, the microcontroller 32 is able to trigger the switch SW2 30 at various voltage points along the 120 volt AC sine wave by measuring the time from a zero crossing. In this way, the linear charger circuit 24 is able to control the starting and/or charging currents. The shorter the time delay between a zero crossing and the trigger signal to the switch SW2 30, the higher the starting/charging current. More specifically with reference to FIG. 6, the various voltage points along the 120 volt AC sine wave correspond to instantaneous voltage levels as a function of time. For example, the voltage level $V_s$ during the positive half cycle corresponds to the time $t_s$. Assuming that the time $t_s$ provides the desired starting current, the microcontroller 32 would trigger the switch SW2 30 to be closed at the time $t_s$ and the switch SW2 30 will reopen whenever the current that flows through the switch SW2 30 has dropped to zero. Under the control of the microcontroller 32, the desired starting current is applied to the output terminals 25. In this mode of operation, the switch SW1 28 is open, thus disconnecting the high frequency charger circuit 22 from the battery during a starting current mode of operation to avoid back feeding the high frequency charger circuit 22. During this mode of operation, the microcontroller power Va is provided by the secondary winding of the transformer T1 by way of the diodes D7 and D14.

In a second mode of operation, for example, a battery charging mode, the linear charger circuit 24 is used to charge a battery during relatively high load conditions, e.g., when the battery charging current is at or above a predetermined level. For an exemplary 10 amp continuous linear charger circuit, the predetermined level may be at or above, for example, 7.0 amps DC. In this mode of operation, the switch SW2 30 switches along the 120 volt AC sine wave at a relatively longer time delay after detecting a zero crossing than the time delay of the starting current mode to provide the required charging current under the control of the microcontroller 32. In this mode of operation, the switch SW1 28 may be open.

In a third mode of operation, a high frequency charging mode, the battery is charged by the high frequency charger circuit 22. In this mode, the switch SW2 30 is open, thus disconnecting the linear charger circuit 24 from the circuit, and the switch SW1 28 is closed. As mentioned above, the high frequency mode of operation is used when the load current, i.e., charging current is less than a predetermined level. A current sense resistor is placed in series with the output terminals 25. The voltage across the current sense resistor 38 is read by the microcontroller 32 as an indication of the charging current supplied to the battery. Thus, when the charging current drops below a predetermined level, as mentioned above, the hybrid charger 20 switches from the linear charger circuit 24 to the high frequency charger circuit 22.

The hybrid charger 20 may be provided with an optional fourth mode of operation, parallel mode, in which the high frequency charger circuit 22 is in parallel with the linear charger circuit 24. In this mode of operation, the linear charger circuit 24 and the high frequency charger circuit 22 combine to provide a combined charging current that exceeds the continuous rating of either the linear charger circuit 24 or the high frequency charger circuit 22 individually. For example, assuming the high frequency charger circuit 22 has a continuous rating of 2.0 amps DC and the linear charger circuit has a continuous rating of 10.0 amps DC, the hybrid charger 20 can provide 12.0 amps DC continuously when in a parallel mode of operation.

The hybrid battery charger 20 may optionally be provided with an optional fifth mode of operation, a standby mode in which the switch SW1 28 is opened when the battery is disconnected from the output terminals 25. In this mode of operation, the battery voltage is sensed by a voltage sense circuit 40. When the voltage sense circuit 40 senses a loss of battery voltage, the switch SW1 28 is opened under the control of the microcontroller 32 to remove all power from the output terminals 25.

In accordance with another important aspect of the invention, the hybrid battery charger 20 may incorporate a variable frequency drive circuit 42. The variable frequency drive circuit 42 may be used to control the switching frequency of the high frequency charger circuit 22. As will be discussed in more detail below, the variable frequency drive circuit 42, for example, a "green mode" controller, such as a Fairchild SG6859A, controls the switching frequency as a function of the load current. An exemplary variable frequency drive circuit 42 can be used to vary the switching frequency of the high frequency charger circuit 22 from 20 KHz to 100 KHz, for example. At relatively low load conditions, the variable frequency drive circuit 42 switches at the lower frequency in order to reduce switching losses. The variable frequency drive circuit 42 may optionally skip cycles when the green mode controller enters the green mode, i.e., the voltage to the feedback pin of the PWM controller is above 2.8 volts DC.

Schematic Diagram.

Figure 3A:
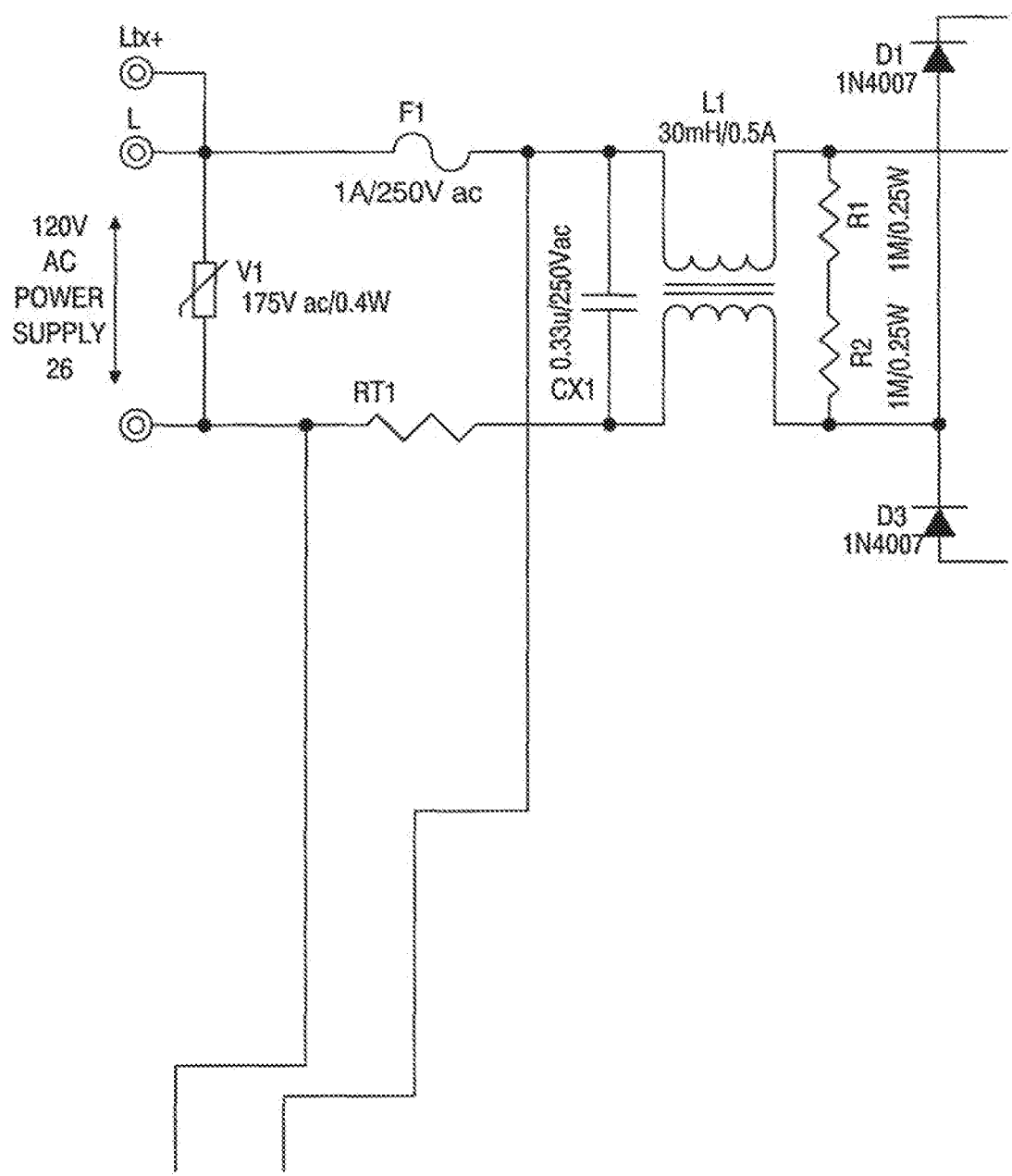
FIGS. 3A-3G illustrate an exemplary schematic diagram of the hybrid battery charger in accordance with the present invention.
Figure 3B:
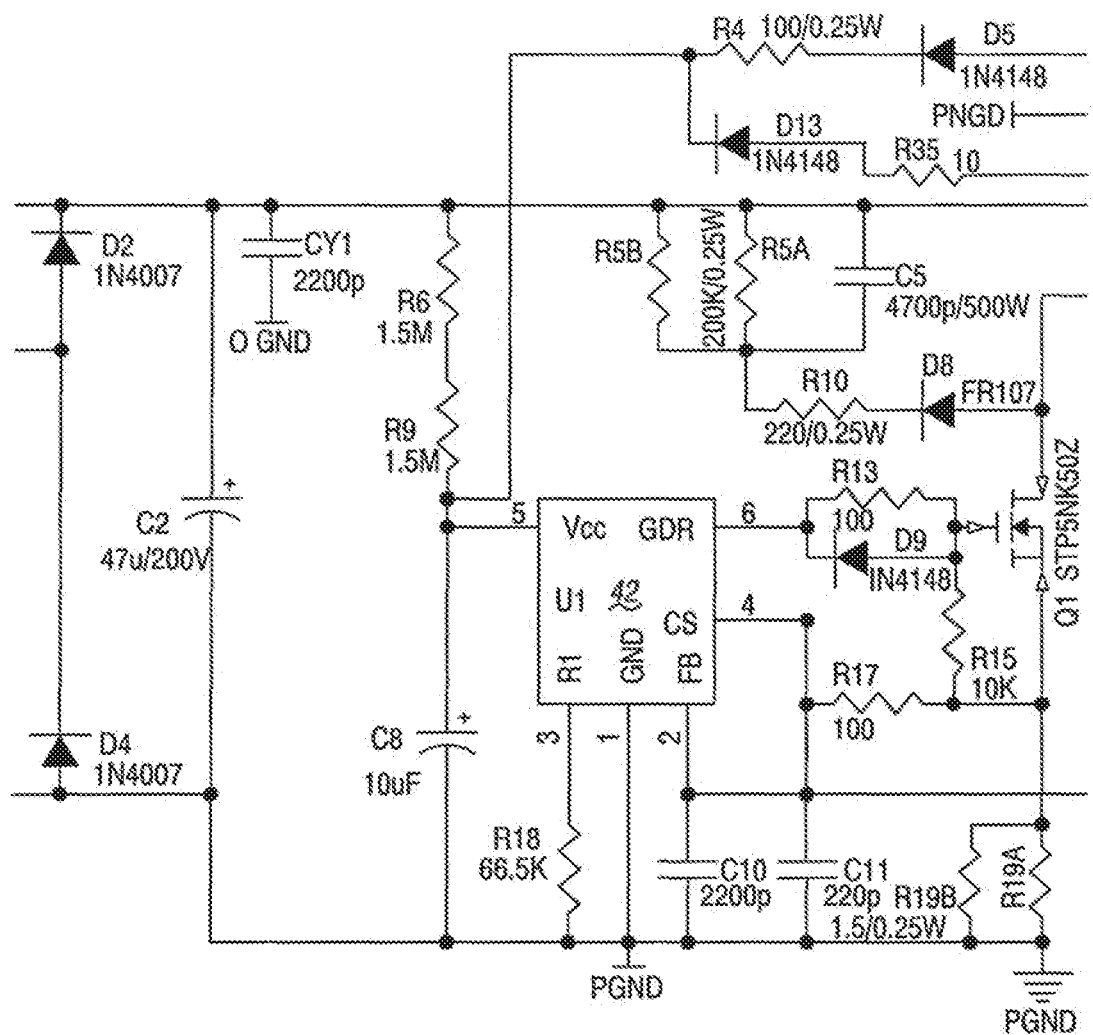
Figure 3C:
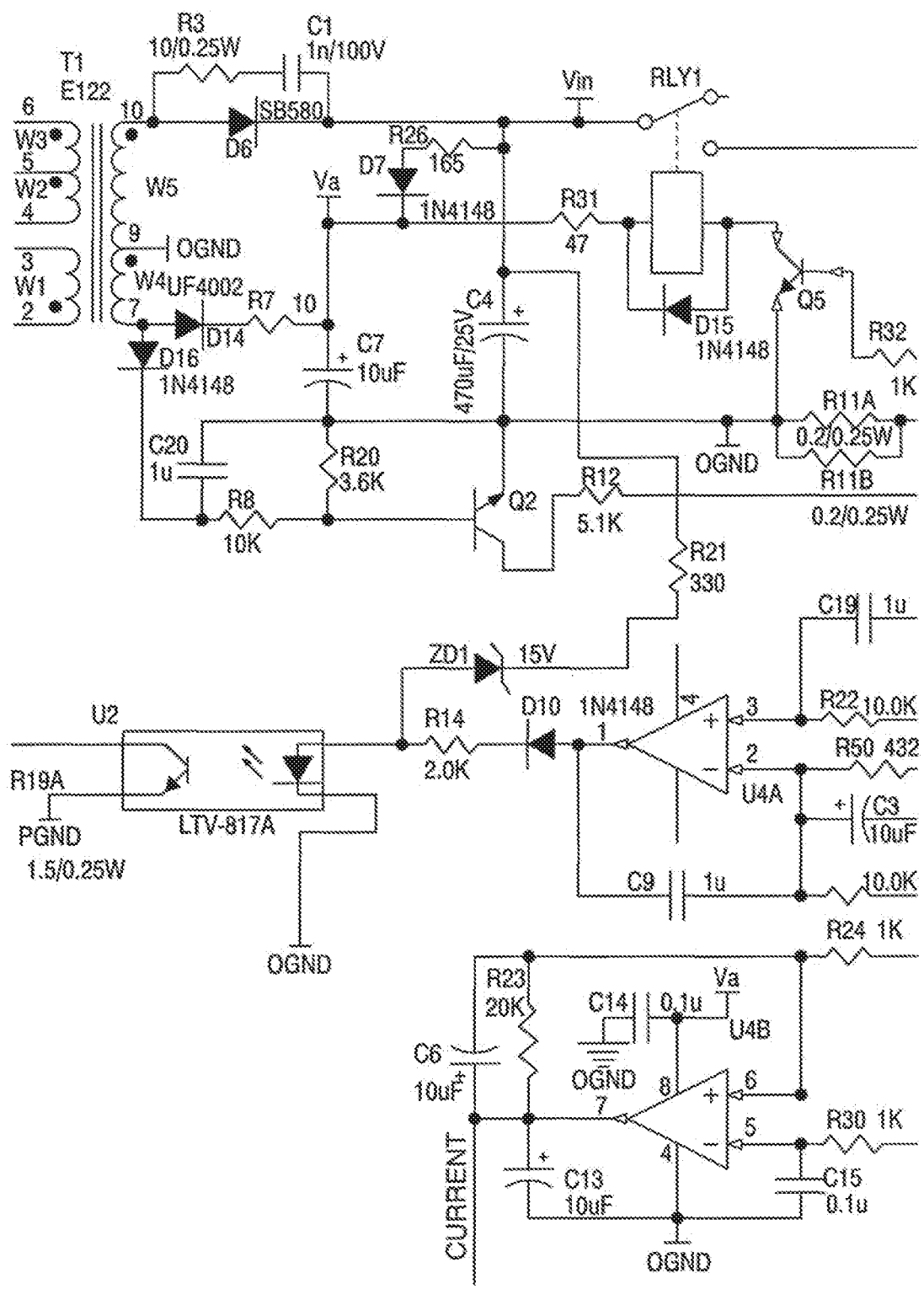
Figure 3D:
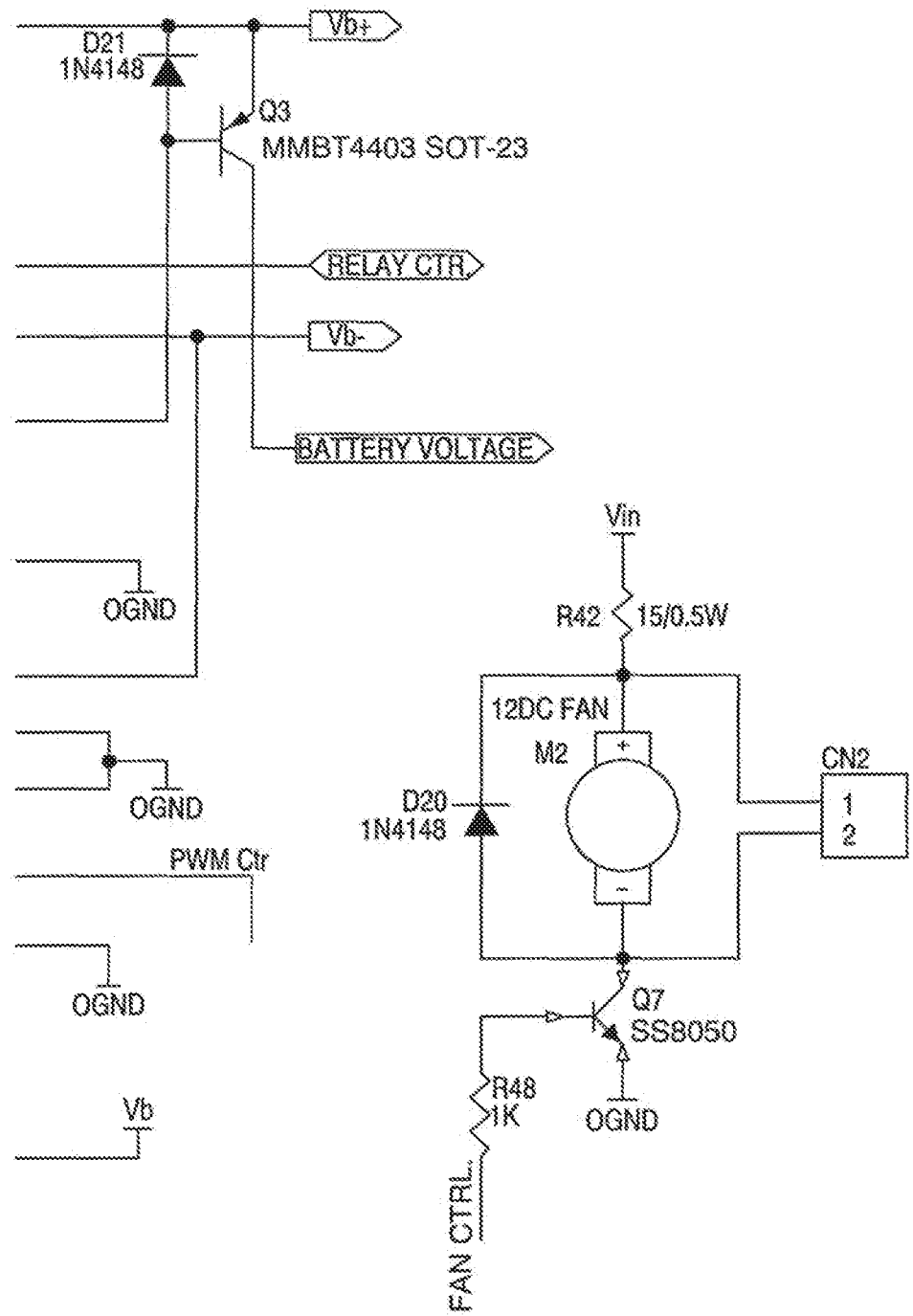

An exemplary schematic diagram of the hybrid battery charger 20 including a control circuit is illustrated in FIGS. 3A-3G. An exemplary schematic diagram of a portion of the control circuit that includes a microcontroller 32 is illustrated in FIGS. 4A-4F. The schematic diagram of the hybrid battery charger 20 illustrated in FIGS. 3A-3G illustrates the linear charger circuit 24 in which the switch SW2 30 is implemented as a triac. FIG. 5 illustrates an alternative embodiment of the linear charger circuit 24 in which the switch SW2 30 is implemented as a pair of SCRs.

Linear Charger Circuit.

Figure 3E:
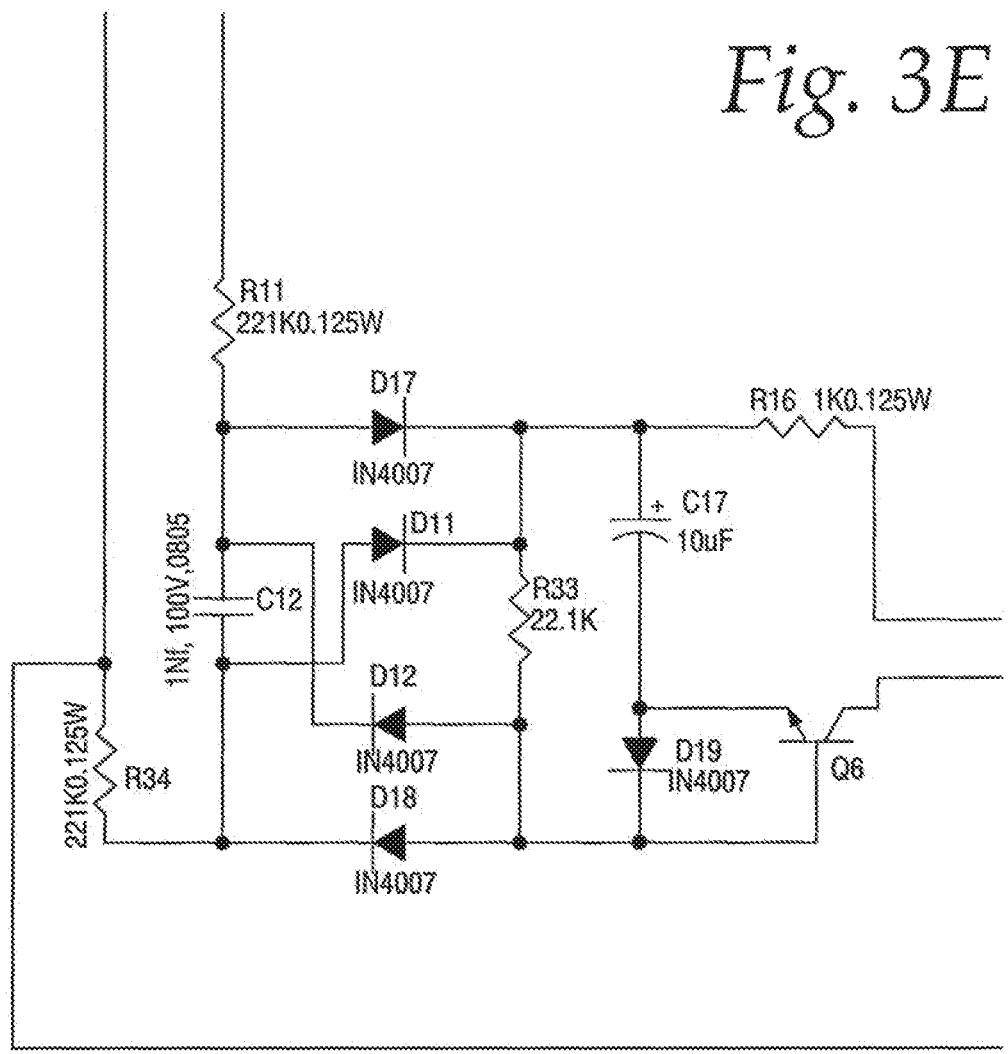
Figure 3F:
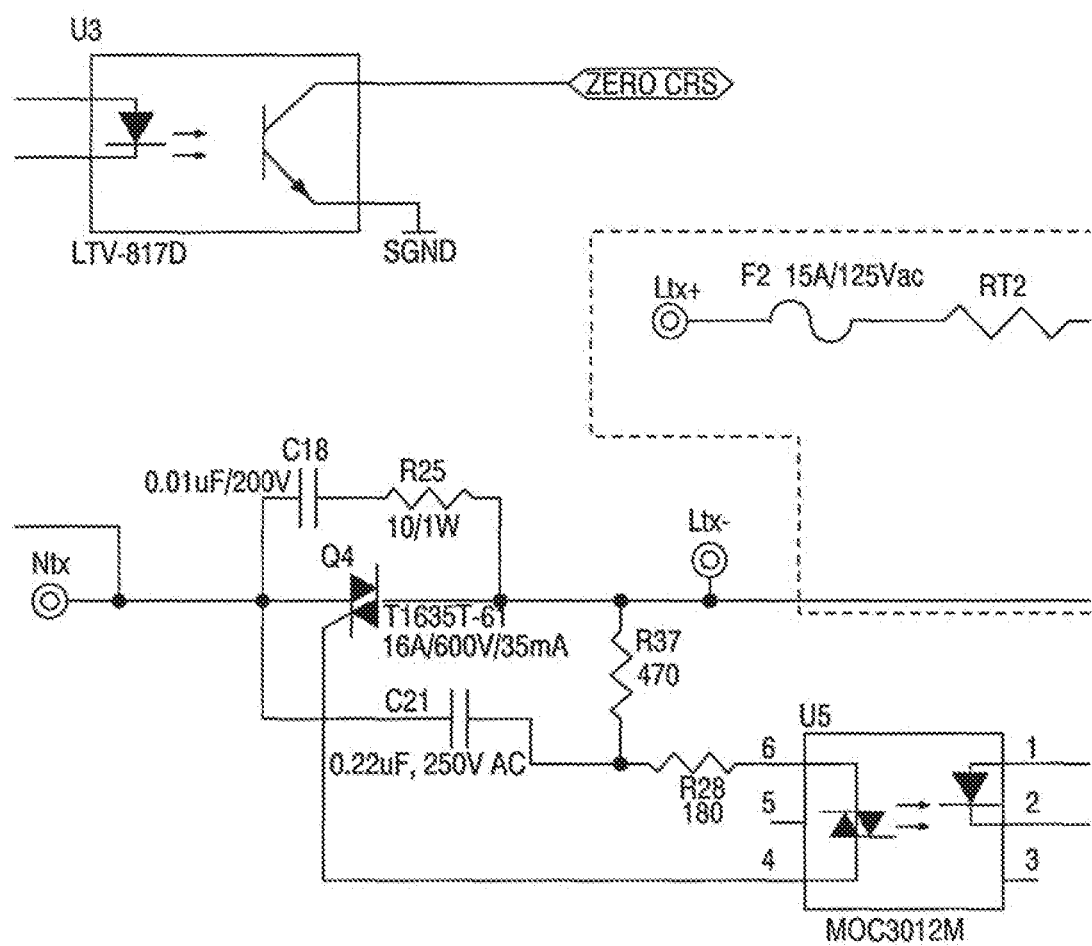
Figure 3G:
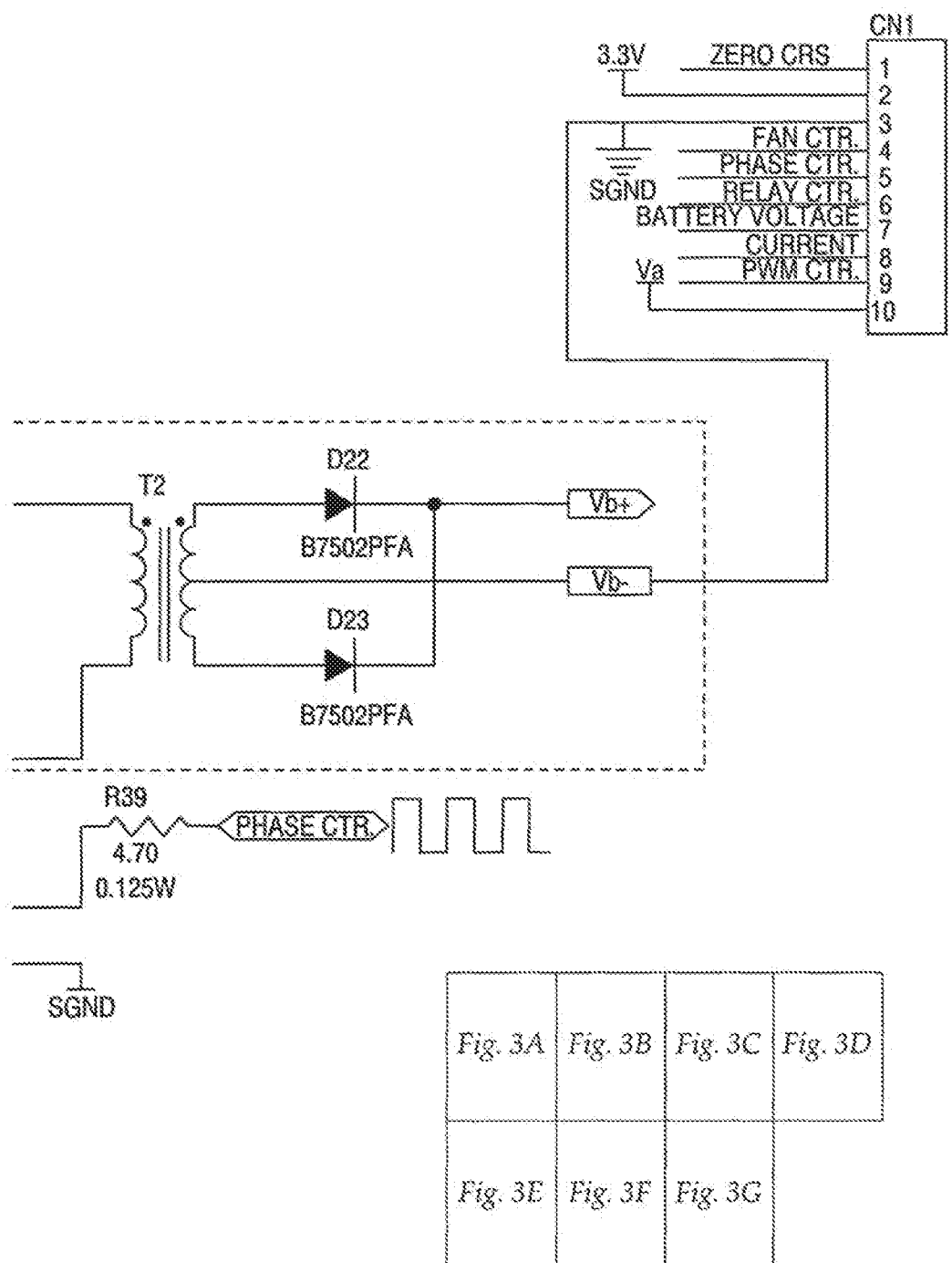
Figure 4A:
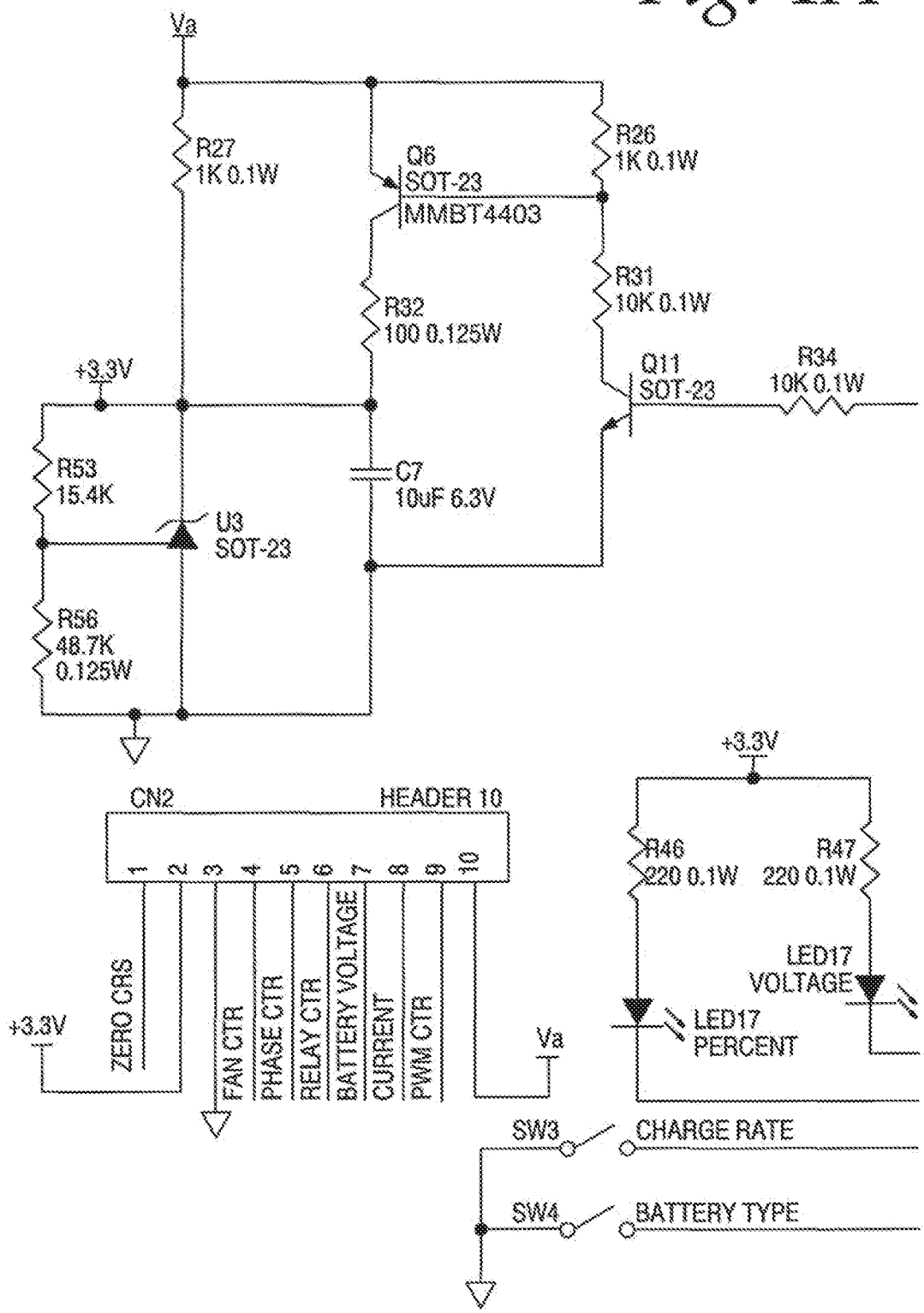
FIGS. 4A-4F illustrate an exemplary schematic diagram of a microcontroller control circuit in accordance with the present invention.
Figure 4B:
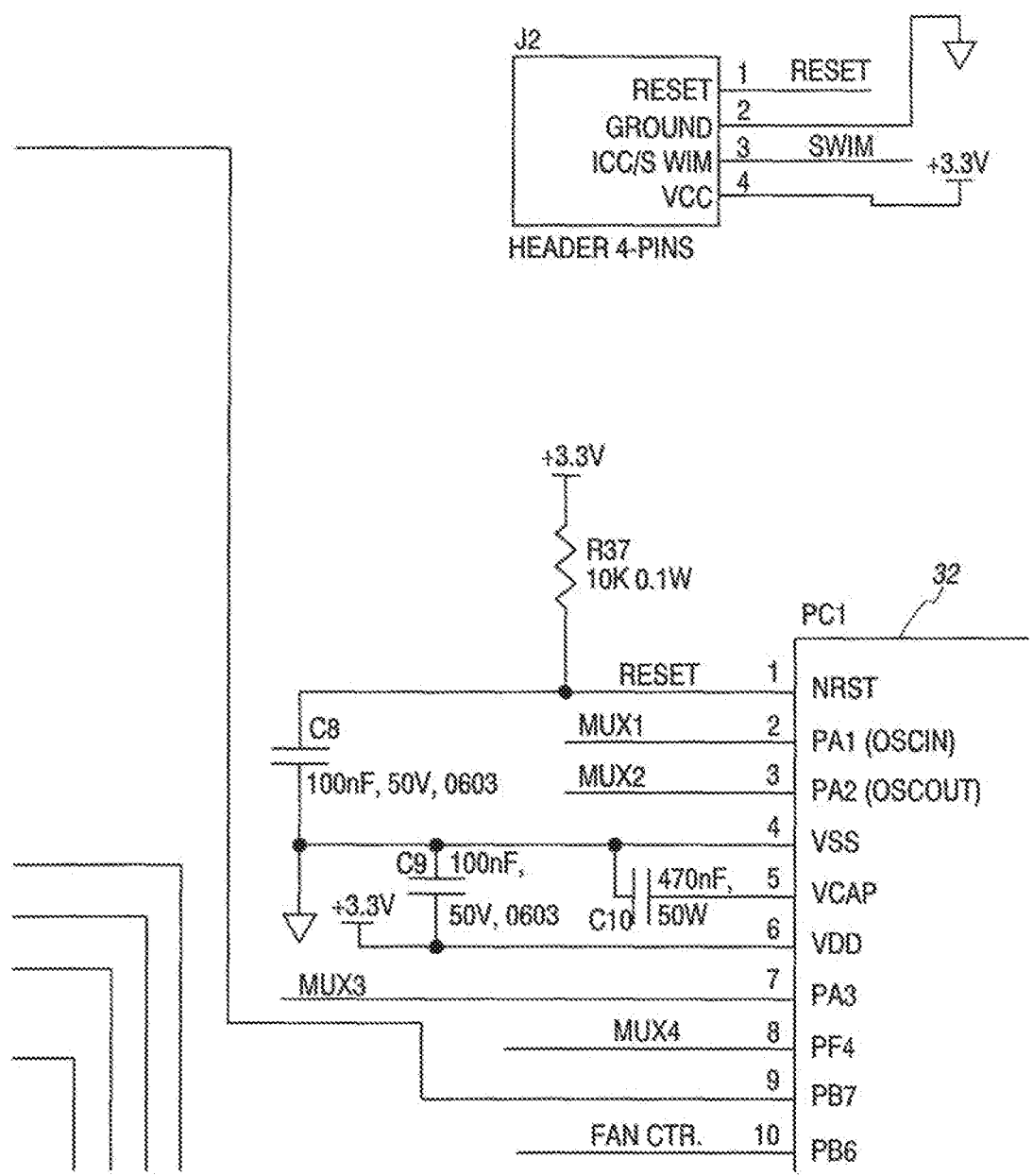
Figure 4C:
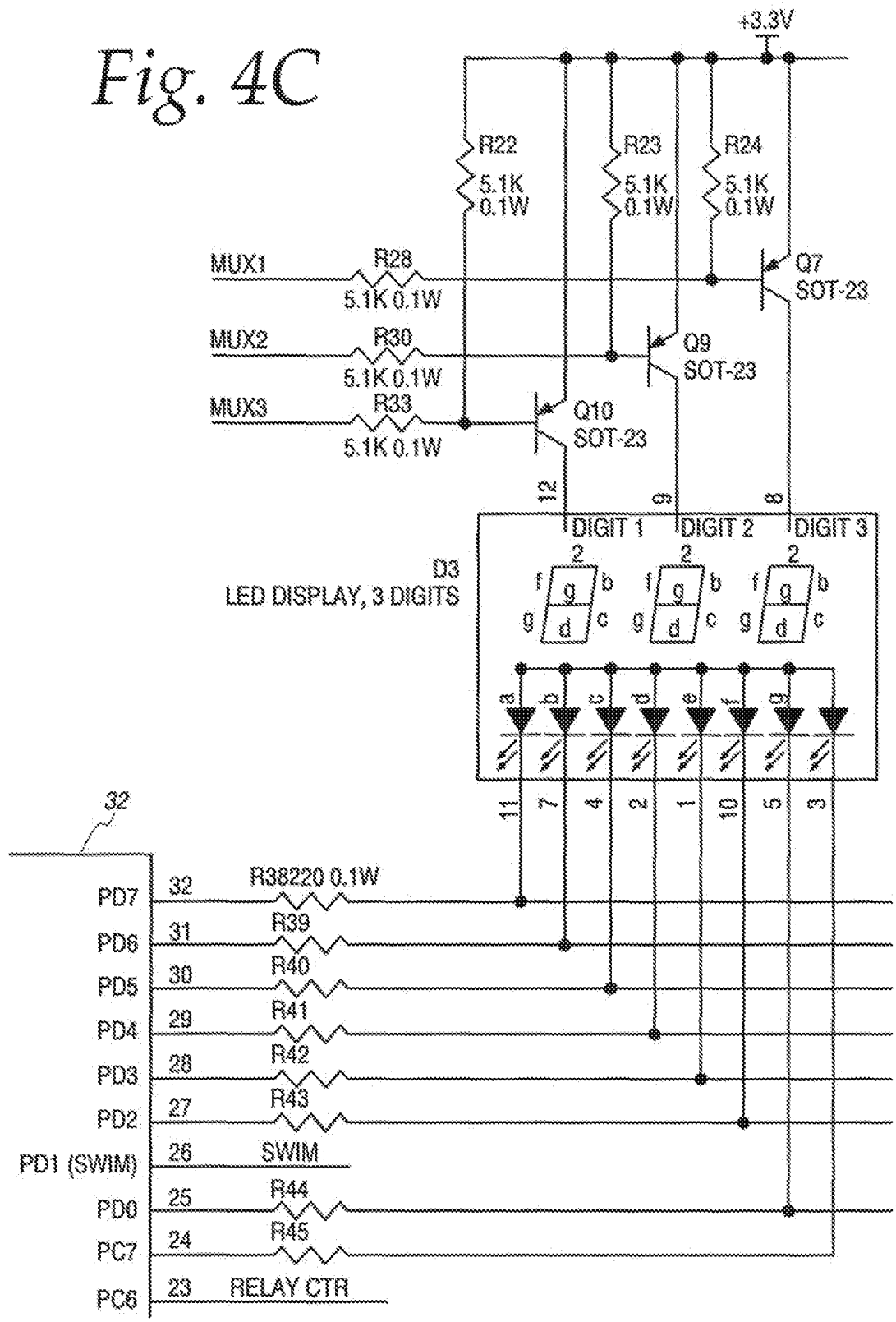

The linear charger circuit 24 (FIG. 1) is shown in FIGS. 3E-3G. As mentioned above, the linear charger circuit provides starting current in a starting mode of operation and charging current in a charging mode of operation when the load current is above a predetermined value, for example 7 amps DC, where the linear charger circuit 24 is most efficient.

Turning to FIGS. 3A-3G, the linear charger circuit 24 includes a triac Q4 (FIG. 3F), which functions as the switch SW2 30, described above. The input to the triac Q4 is connected to the neutral terminal N of the 120 volt AC power supply 26 (FIG. 3A). The output of the triac Q4 (FIG. 3F) is connected to one leg of a transformer T2 (FIG. 3G). The opposing leg of the transformer T2 is connected to a terminal Ltx$^+$ (FIG. 3F), which is connected to the line terminal L of the 120 volt AC power supply 26 (FIG. 3A) by way of a fuse F2 and a temperature sensing resistor RT2. A surge suppressor V1 may be connected between the line and neutral terminals L and N, respectively, to suppress voltage spikes.

The transformer T2 (FIG. 3G), designed for working at 50/60 Hz (low frequency), is a current transformer for transforming the input current applied to the primary winding to provide either a starting current or a charging current as an inverse function of its turn ratio and the voltage applied to the primary. As mention above, the triac Q4 (FIG. 3F) can switch at various voltage points along the 120 volt AC sine wave (FIG. 6) to provide either a desired starting current or a desired charging current.

The triac Q4 (FIG. 3F) is under the control of the microcontroller 32 (FIGS. 4B, 4C, 4E, and 4F). More particularly, the microcontroller 32 provides a series of phase control signals, identified as a "Phase Ctr." signal. These control signals control the voltage point along the 120 volt sine wave (FIG. 6) that the triac Q4 (FIG. 3F) switches, as discussed above. The phase control signals are applied to the triac Q4 by way of a resistor R39 and an opto-coupler U5. The output of the opto-coupler U5 is applied to the gate of the triac Q4. A voltage divider consisting of the resistors R37 and R28 is applied to the gate of the triac U5 to control the triac Q4 by way of the control signals. A capacitor C21 is connected between the voltage divider and the input to the triac Q4 to provide a steady signal to the gate of the triac Q4.

A noise filter consisting of a serially connected capacitor C18 and resistor R25 is connected across the input and output of the triac Q4 to prevent false switching due to voltage spikes in the 120 volt power supply.

When the triac Q4 is conducting an AC voltage is applied to the primary of the linear transformer T2 (FIG. 3G), as mentioned above. A pair of rectifying diodes D22 and D23 is connected to the secondary winding of the transformer T2 to provide full wave rectification. During the positive half cycle of the AC sine wave, the diode D22 conducts and the diode D23 is off. During this positive half cycle, a positive rectified DC output voltage is applied to the positive battery terminal Vb$^+$. During the negative half cycle of the AC sine wave, the diode D23 is on and the diode D22 is off. Since the cathode of the diode D23 is connected to the positive battery terminal Vb$^+$, a positive rectified DC output voltage is still applied to the battery terminal Vb$^+$ during the negative half cycle of the sine wave to provide a continuous rectified DC voltage to the battery terminal Vb$^+$.

The secondary winding of the transformer T2 is tapped and connected to system ground SGND. As shown, the secondary winding is shown with an exemplary center tap and connected to a connector CN1, which, in turn, is connected to the negative batter terminal Vb$^-$.

An alternative linear charger circuit is shown in FIG. 5. In this embodiment, two SCRs 04 and 08 are used in place of the triac. In this embodiment, the output of the opto-coupler U5 is used to trigger the gates of the SCRs Q4 and Q8 separately. During positive half cycles, the diode D22 is off and the diode D25 and the SCR Q8 is conducting. During negative half cycles, the diode D22 is on and the diode D25 is off and the SCR 04 is conducting.

The SCRs 04 and Q8 are connected in parallel with a snubber circuit, as discussed above, consisting of the serially connected resistor R25 and capacitor C18. A gate resistor R28 and capacitor C21 may be connected between the opto-coupler U5 and the SCR 08.

As mentioned above, the linear charger circuit 24 is only used when the load current is more than a predetermined value, for example 7.0 amps DC. While the linear charger circuit 24 is charging a battery, the charging current is measured by the current sense circuit 38 (FIG. 1), as will be discussed below. The switch SW1 28 is closed and the microcontroller 32 (FIGS. 4B, 4C, 4E, and 4F) reads the charging current supplied to the battery. When the charging current drops below a predetermined value, for example 7 amps DC, the microcontroller 32 signals the triac Q4 (FIG. 3F) or alternatively, the SCRs Q4 and Q8 (FIG. 5) to open by way of the Phase Ctr. Signal to disconnect the linear charger circuit 24 from the 120 volt power supply 26 (FIG. 3A). As mentioned above, this is done so that the linear charger circuit 24 (FIG. 1) is only used to charge batteries when the load current is above a predetermined value, for example 7 amps DC, where it is most efficient. Once the linear charger circuit 24 is disconnected from the 120 volt AC power supply 26 (FIG. 3A), the high frequency charger circuit 22 takes over and continues to charge the battery.

Current Sense Circuit.

The current sense circuit 38 (FIG. 1) is illustrated in FIGS. 3C and 3D. The current sense circuit 38 senses the battery charging current by way of a current sense resistor R11A (FIG. 3C). One side of the current sense resistor R11A is connected to the negative battery terminal Vb$^-$ (FIG. 3D). The other side of the current sense resistor R11A is connected to ground OGND. The voltage across the current sense resistor R11A is applied to the current sense circuit 38 which includes an amplifier U4B, input resistors R24 and R30 and an output resistor R23. The ratio of the resistors R30/R24 determines the gain of the amplifier U4B. In this exemplary case, the gain is 20. The voltage across the current sense resistor R11A is applied to the + and − terminals of the amplifier U4B. The resistor R30 and the capacitor C1 5, connected to the non-inverting input of the operational amplifier U48 form a low pass filter for filtering input noise due to the high frequency switching of the voltage across the current sense resistor R11A. A pair of capacitors C6 and C13 are connected between the output of the operational amplifier U4B and the input signal to stabilize the input and output voltages of the operational amplifier U4B.

The operational amplifier U4B amplifies the voltage across the current sense resistor R11A and provides an output signal, identified as CURRENT. The CURRENT signal is connected to pin 8 of the connector CN1 (FIG. 3G). The connector CN1, in turn, is connected to the connector CN2 (FIG. 4A), which is connected to the microcontroller 32 (FIGS. 4B, 4C, 4E, and 4F). As discussed above, the microcontroller 32 controls the charging and starting current provided to a battery connected to its output terminals Vb$^+$ and Vb$^-$ 25.

Power to the operational amplifier U4B is identified as a voltage Va, derived from the positive battery voltage Vb$^+$ (FIG. 3D) by way of a resistor R26, diodes D7 and D14 and a resistor R7. A capacitor C14 is used to stabilize the voltage Va applied to a power supply input of the operational amplifier U4B. The negative power supply input of the operational amplifier U4B is connected to ground OGND.

Voltage Sense Circuit.

The voltage sense circuit 40 (FIG. 1) is illustrated in FIG. 3D. The voltage sense circuit 40 includes a transistor Q3. The emitter of the transistor Q3 is connected to the positive battery terminal Vb$^+$. The collector of the transistor Q3 is a signal identified as BATTERY VOLTAGE. This signal is applied to the microcontroller 32 (FIGS. 4B, 4C, 4E, and 4F) by way of the connectors CN1 (FIG. 3G) and CN2 (FIG. 4A). The transistor Q3 (FIG. 3D) is under the control of the transistor Q2 (FIG. 3C) and the diode D16. The diode D16 is connected to the negative polarity side of one of the secondary windings of the flyback transformer T1. As will be discussed in more detail below, the primary windings of the flyback transformer T1 are switched on and off by a switch, for example, a FET Q1. When the switch Q1 is closed, the negative polarity side of the secondary winding of the flyback transformer T1 will be positive, thus causing the diode D16 to conduct. The cathode of the diode D16 is connected to the base of the transistor Q2 by way current limiting resistor R8. A parallel combination of a biasing resistor R20 and a capacitor C20 is connected across the base and emitter terminals of the transistor Q2 to bias the transistor Q2. This causes the transistor Q2 to be connected to the positive voltage on the negative polarity side of the secondary winding and thus turn on. The collector of the transistor Q2 is connected to the base of the transistor Q3 (FIG. 3D), which turns on the transistor Q3 (FIG. 3D). The emitter of the transistor Q3 is connected to the positive battery terminal Vb$^+$. The collector of the transistor Q3 is the BATTERY VOLTAGE signal which is applied to the microcontroller 32 (FIGS. 4B, 4C, 4E, and 4F) by way of the connectors CN 1 (FIG. 3G) and CN2 (FIG. 4A).

Whenever the external 120 volt AC power supply is lost, for example, when the 120 volt AC is turned off by a user or the 120 volt AC is otherwise not available, the primary side circuit will lose power. As such, the PWM controller U1 will stop working and the FET 01 will turn off. This causes the secondary windings W4 and W5 to lose power, which, in turn, will cause the transistors Q2 and Q3 to turn off. As a consequence, the BATTERY VOLTAGE signal disappears, and the microcontroller 32 knows the 120 volt AC power supply is lost and consequently turns off the relay RLY1. This causes the bias power Va to lose power, which, in turn, causes all of the secondary control circuit including the microcontroller 32 to lose power and shut down. In essence, the hybrid battery charger 20 stops working. Without the help of a special circuit, which comprises a diode D16, a capacitor C20, resistors R8 and R20, transistors Q2 and Q3, and a resistor R1 2, the microcontroller 32 will not know if the 120 volt AC power supply is lost since the microcontroller 32 will get power from the battery undercharging through resistor 26, diode D7 to the bias power Va even the 120 volt AC power supply has been lost. Thus, the undercharging battery will eventually be discharged to dead when the 120 volt AC power supply is unavailable.

Zero Crossing Circuit

The zero crossing circuit 34 (FIG. 1) is illustrated in FIGS. 3E and 3F. As mentioned above, the zero crossing circuit 34 determines the zero crossings of the 120 volt AC power supply 26 in order to determine the correct point in time to fire the triac or the SCRs. The zero crossing circuit 34 includes the diodes D11, D12, D17 and D18. The line L and neutral N rails are applied to the zero crossing circuit 34 by way of current limiting resistors R11 and R34. A capacitor C12 is provided between the line L and neutral N rails to filter the noise of the power supply. During positive half cycles of the 120 volt AC power, the diodes D17 and D18 will conduct and during the negative half cycle, the diodes D11 and D12 will conduct. Resistors R11, R33 and R34 form a voltage divider supplies AC voltage to the resistor R33. Whenever the voltage of R33 is higher than the voltage of capacitor C17, a diode D19 will conduct causing a current to flow to the charging capacitor C17. While the diode D19 is conducting, the transistor Q6 is off because its base to emitter is reverse biased by the diode D19. Thus, during this condition, no current flows through the LED diode of the opto-coupler U3. As such, the phototransistor of U3 will be off and generate a logical "1" to the microcontroller 32. When the 120 volt AC power supply crosses zero, the diode D19 is turned off, thus the voltage of capacitor C17 through resistor R33 is applied to the base of transistor Q6, then turning on the transistor Q6 and the opto-coupler U3. When the transistor Q6 is on during the zero crossing, a logical 0 is available at the collector of the output transistor of the opto coupler U3 indicating a zero crossing as indicated by the signal "Zero Crs." The signal "Zero Crs" is applied to the microcontroller 32 by way of the connectors CN1 (FIG. 3G) and CN2 (FIG. 4A).

As the AC voltage rises the diode D19 will be turned back on and the capacitor C17 will continue to charge causing a logical "1" to be produced at the output of the opto-coupler U3. At the next zero crossing, the diode D19 again drops out and a logical "0" is provided as the "Zero Crs" signal. The cycle repeats until the hybrid battery charger 20 is disconnected from the 120 volt power supply.

High Frequency Charger Circuit.

The high frequency charger circuit 22 (FIG. 1) is illustrated in FIGS. 3A, 3B, 3C, and 3D. The high frequency charger circuit 22 is connected to the 120 volt AC power supply rails L and N by way of a fuse F1 (FIG. 3A) and a NTC thermistor RT1 or other temperature sensor. An EMC filter consisting of CX1 and an inductance L1 is connected between the line L and neutral rails N. A pair of serially coupled resistors R1 and R2 is connected across the line L and neutral rails N in order to discharge the capacitor CX1. A full wave rectifier consisting of the diodes D1, D2, D3, and D4 (FIGS. 3A and 3B) is also connected to the line L and neutral rails N. The full wave rectifier converts the 120 volt AC voltage to a rectified DC voltage. A capacitor C2 (FIG. 3B) is connected across the output of the full wave rectifier to smooth out the DC output voltage of the full wave rectifier.

The high frequency charger circuit 22 includes a flyback transformer T1 (FIG. 3C). In this case, the flyback transformer T1 includes a single primary winding, identified as W1, three (3) bias windings, identified as W2, W3, and W4 and a secondary winding, identified as W5. As will be discussed in more detail below, the bias windings W2, W3, and W4 are separated from the primary winding W1 by insulation, as shown in FIG. 8B. The bias windings W2, W3, and W4 provide stable AC power to the PWM controller U1 and the microcontroller 32 during various operational conditions including low battery voltage condition as discussed below. In particular, the negative polarity side of the primary winding W1 is connected to the output of the bridge rectifier (FIGS. 3A and 3B). A capacitor CY1 is used to improve EMC performance. The positive polarity side of the primary winding W1 is connected to primary side ground PGND (FIG. 3B) by way of a switch Q1 and a parallel pair of current sensing resistors R19A and R19B. The switch Q1, implemented as a FET, is used to connect and disconnect the positive side of the primary winding W1 to ground PGND under the control of variable frequency drive circuit 42 (FIG. 1), discussed below. The variable frequency drive circuit 42 causes the switch Q1 to switch between, for example, 20 KHz and 100 KHz, for example, as a function of the load current.

When the switch Q1 (FIG. 3B) is closed, the primary winding W1 is connected to the DC output of the bridge rectifier. This causes primary current to flow through the primary winding W1 which builds up the magnetic flux and energy in the transformer T1. During this condition, a voltage is induced in the secondary windings W4 and W5 (FIG. 3C) of the transformer T1. During this time, a diode D8 (FIG. 3B), connected between the negative polarity of the primary winding W1 and the output of the bridge rectifier, is off. While the switch Q1 (FIG. 3B) is closed, the diode D6 (FIG. 3C), connected to the positive polarity of the secondary winding W5, will also be off, thus preventing an output capacitor C4 from charging. The diode D13, diode D14 and D16 will be on because the windings W2 and W4 have the same polarity as winding W1. Thus, capacitor C7, C8 and C20 will be charged.

When the switch Q1 (FIG. 3B) is open, the diode D8 turns on to clamp the voltage spike, caused by the leakage inductance of the transformer T1, to a safe level for the FET through the resistor R1 0 and the parallel resistors R5A and R5B and the capacitor C5. This causes positive voltages across the bias winding W3 and the secondary winding W4, which, in turn, turns on the diode D5 (FIG. 3B) allowing the capacitor C8 to be charged to supply power to U1. This also turns on the diode D6 (FIG. 3C) allowing the output capacitor C4 to charge and supply load current to the battery. The diode D7 is also turned on which provides power to the relay RLY1 by way of a resistor R31. With power to the relay RLY1, the relay contact is able to close allowing current to be delivered to the battery when microcontroller 32 sends a signal to turn on the transistor Q5. A diode D15 may be connected across the relay RLY1 to act as a snubber during switching of the relay RLY1. The relay is under the control of a relay control signal Relay Ctr by way of a resistor R32 and a switch Q5.

The output terminals Vb+ and Vb− 25 are connected in parallel across the output capacitor C4, which supplies the load current to a battery cell (not shown) connected to the output terminals Vb+ and Vb− 25 when the switch Q1 is closed. When the switch Q1 is open, the secondary winding W5 through diode D6 charges the output capacitor C4 and supplies the load current to the battery as well. As discussed in more detail below, the on and off times of the switch Q1 are controlled by the variable frequency drive circuit 42, discussed below.

Variable Frequency Drive Circuit.

The variable frequency drive circuit 42 (FIG. 1) is illustrated in FIGS. 3B and 3C. The variable frequency drive circuit 42 may include a PWM controller U1, for example, a Fairchild Model SG6859A PWM controller for flyback converters. Other PWM controllers are also suitable. The PWM controller U1 includes a green mode function which decreases the switching frequency under light load and no-load conditions. The feedback circuit 43 consists of a voltage feedback circuit and a current feedback circuit. The voltage feedback circuit is formed by the resistor R21, zener diode ZD1 and an opto-coupler U2. The voltage feedback circuit limits the Vin voltage to the predetermined value, for example, 16.2V. The current feedback circuit is formed by the current sensing resistors R11A and R11B, the capacitors C3, C9, and C19, the resistors R14, R22, R50, and R27, an operational amplifier U4A, a diode d10, and an opto-coupler U2. The opto-coupler U2 combines the voltage feedback signal and current feedback signal together, then sends it to the pin FB of the PWM controller U1. Once the feedback signal at pin FB of U1 exceeds a threshold, the switching frequency decreases in order to conserve power during light load and no load conditions. For the above mentioned PWM controller, U1, the frequency can vary between 20 KHz and 100 KHz. Decreasing the switching frequency dramatically reduces power consumption.

The current feedback circuit includes a difference amplifier U4A (FIG. 3C) and an opto-coupler U2 (FIG. 3C) connected to a feedback pin FB (FIG. 3B) of the PWM controller U1. The difference amplifier U4A (FIG. 3C) compares the voltage of the current sensing resistor R11A, which represents the charging current with a reference signal. In this case, the reference signal is formed by the PWM Ctr signal, which comes from the microcontroller 32, through the RC filter circuit consisting of the resistor R27 and a capacitor C3. The output of the difference amplifier U4A is applied to the opto-coupler U2.

The PWM controller U1 (FIG. 3B) optionally includes a "green-mode function," for example, as provided by way of a Fairchild Model SG6859A PWM controller or equivalent. The green mode function causes the PWM to automatically reduce the frequency of the switching of the switch Q1 as a function of the load current. At relatively low load current conditions, the frequency of the PWM controller U1 is reduced. At no-load conditions, the frequency is reduced further by skipping a number of switching cycles. Reducing the frequency and eliminating cycles of the switching of the switch Q1 reduces the power losses.

As mentioned above, the high frequency charger circuit 22 has two control modes, voltage control mode and current control mode. Before the microcontroller 32 closes the relay RLY1 (FIG. 3C), the high frequency charger circuit 22 works in the voltage control mode. In this mode, the resistor R21 is serially connected to zener diode ZD1. The serial connection is connected between the output of the difference amplifier U4A and the positive battery voltage Vb+. Since the relay RLY1 is open, there is no current from the high frequency charger circuit 22 to battery, the voltage of the amplifier U4A (FIG. 3C) is low, which causes diode D10 to be off. Thus, only resistor R21 senses the voltage Vin and applies the voltage feedback signal through ZD1 to opto-coupler U2. Whenever the Vin voltage is higher than the predetermined value, for example 16.2V, the zener diode ZD1 will turn on, which in turn, turns on the opto-coupler U2, which adjusts the voltage at FB pin of the PWM controller 42. In this way, the Vin voltage is maintained at the predetermined value, so called voltage control mode. When the relay RLY1 closes, a charging current flows to the positive battery terminal Vb+ and returns from the negative battery terminal Vb−. The current sensing resistors R11A and R11B sense the charging current and send the current signal to the non-inverting pin 3 of the amplifier U4A through the RC filter which is consist of resistor R22 and capacitor C19. The amplifier U4A compares the charging current signal at pin 3 with a target charging current setting at the inverting input pin 2 of U4A which comes from the signal marked as "PWM Ctr" from the microcontroller 32 through the connector CN1, the RC filter which comprises the resistors R27 and R50 and the capacitor C3. If the charging current signal at pin 3 of U4A is higher than the target charging current, at pin 2 of U4A, which is set by the microcontroller 32, the output voltage at pin 1 of U4A becomes high, the diode D10 turns on, which, in turn, adjusts the voltage at FB pin of the PWM controller 42. Thus, the charging current is maintained at the target charging current set by the microcontroller 32 when the charger is in the current control mode. Since the voltage of a 12V battery is lower than the predetermined voltage Vin which is decided by the voltage control mode, thus the voltage control mode is inactive during the current control mode. A capacitor C10 is also connected to the feedback pin FB of the PWM controller U1 for voltage stabilization.

The PWM controller 42 has two different operation modes according to the voltage level at its FB pin. They are "Green Mode" and "Normal Mode." When the voltage at FB pin of the PWM controller 42 falls in a certain range, for example, 2.2 volt 2.8 volt, the PWM controller enters "Green Mode." Within the Green Mode, the operating frequency of the PWM controller declines linearly as the voltage at FB increases due to the charging load declining. Thus the power losses at the switcher FET Q1, the transformer T1 and the output diode D6 decline as the PWM frequency decreases, and it leads to higher efficiency at light load conditions. As the charging load increases, the voltage at FB pin of the PWM controller decreases. When the voltage at FB pin falls below a certain voltage specified by the PWM controller 42, for example, 2.2 volts, the PWM controller 42 enters into "Normal Mode," meaning the PWM controller will work at the maximum operation frequency predetermined by resistor R18.

A capacitor C19 (FIG. 3C) is connected to the non-inverting input terminal of the difference amplifier U4A and ground OGND to filter the noise from the charging current signal. Another capacitor C9 is connected between the inverting terminal of the difference amplifier U4A and the output and forms a negative feedback loop used to stabilize the output voltage of the difference amplifier U4A.

The power supply terminal Vcc (FIG. 3B) of the PWM controller U1 is connected across the output of the bridge rectifier by way of a pair of serially connected resistors R6 and R9 and a capacitor C8. The ground terminal GND on the PWM controller U1 is connected to the positive side ground PGND. A resistor R18 is connected to the R1 pin of the PWM controller U1 to create a constant current source and determine the nominal switching frequency. A current sense pin CS senses the voltage across the resistor R19A and R19B through resistor R17, connected to the positive polarity side of the flyback winding W3 through FET Q1 for over-current protection. The resistor R17 forms a voltage divider with the resistor R15. The CS pin is also connected to ground PGND by way of a capacitor C11. A gate drive pin GDR is connected to the gate of the switch Q1 by way of a resistor R13 and parallel diode D9.

Low Voltage Operation.

The hybrid battery charger 20 allows normal operation down to very low battery voltages, for example down to 1.0 volts DC. In particular, the power supply voltage for the microcontroller 32 (FIGS. 4B, 4C, 4E, and 4F) is derived from a voltage, identified as Va (FIG. 3C). During conditions when the battery is deeply discharged, for example down to 1 volt DC, the discharged battery essentially shorts out the secondary winding W5 and dissipates the energy stored in the transformer. During conditions when the secondary winding is shorted out, the bias winding W3 will also effectively be shorted out because it has the same polarity as the secondary winding W5.

Normally, the voltage supply Va for the microcontroller 32 (FIGS. 4B, 4C, 4E, and 4F) would normally be powered from the secondary winding W5 by way of the diode D7 (FIG. 3C). When the secondary winding W5 is shorted by a deeply discharged battery, the voltage Va becomes too low to maintain the supply voltage of 3.3 volt DC for the microcontroller 32 to cause the microcontroller 32 (FIGS. 4B, 4C, 4E, and 4F) to likely perform erratically. For the same reason, the bias winding W3 cannot maintain a high enough voltage on capacitor C8 causing the PWM controller U1 to also not operate normally.

In order to solve this problem, a pair bias windings W2 and W4 with the opposite polarities to winding W3 and W5 are used to provide the proper power supply voltage to the microcontroller 32 (FIGS. 4B, 4C, 4E, and 4F) and the PWM controller U1 (FIG. 3B) during a condition when the battery is deeply discharged. In particular, the winding W3 (FIG. 3C) is connected to a diode D5 (FIG. 3B) and a serially coupled resistor R4 that will be coupled to the power supply pin VCC of the PWM controller U1. Similarly, the winding W2 is coupled to a resistor R35 and a diode D13 also coupled to the power supply pin VCC of the PWM controller U1. The power supply pin VCC of the PWM controller U1 is coupled between a pair of serially coupled resistors R6 and R9 and ground by way of a capacitor C8. During conditions when the secondary winding W5 of the transformer T1 is shorted out, the bias windings W2 and W4 still get power from the primary winding W1, so that the PWM controller U1 and microcontroller 32 can keep working normally.

During the time the PWM drive pulse goes high, the FET Q1 turns on connecting the non-dot terminal of the primary winding W1 to the positive rail of the DC voltage at capacitor C2. This causes a current flowing from the non-dot terminal to the dot terminal of the winding W1, which, in turn, induces currents flowing out of the non-dot terminals at winding W2, W3, W4, and W5, respectively. Considering the polarity of the diode at each winding, only the diodes D13, D14 and D16, which are connected to winding W2 and W4, respectively, will turn on to enable charging of the capacitors C8, C7, and C20. The diodes D5 and D6, which are connected to windings W3 and W5 respectively, will be off. The windings W2 and W4 are so called "Forward Windings," while the windings W3 and W5 are known as "Flyback Windings." Since the diodes D5 and D6 are off, the induced energy will be stored in the flyback windings W3 and W5 during the period of the FET Q1 on. When the PWM controller U1 turns off the drive pulse, the FET Q1 will turn off disconnecting Q1 from the DC voltage at the capacitor C2. Thus, the forward winding SW2 30 and W4 will lose power also, and the diodes D13, D14 and D16 will turn off. Meanwhile the energy stored in the flyback windings W3 and W5 during FET Q1 on, will force the diodes D5 and D6 to be forward biased and turn on the two diodes, thus providing charging currents to the capacitor C8 and C4 respectively. In summary, in one PWM cycle, during the PWM drive pulse high, the PWM controller U1 gets power from the winding W2 through the resistor R35, diode D13 and the capacitor C8 and the bias source Va to the control circuit. The microcontroller 32 gets power from the winding W4 through diode D14, resistor R7 and capacitor C7. During the PWM drive pulse low, the PWM controller U1 gets power from winding W3 through the diode D5, the resistor R4 and the capacitor C8; while the bias source Va gets power from winding W5 through diode D6, resistor R26, diode D7 and capacitor C7. Thus, there are two paths to feed power to the PWM controller U1 and the bias power Va respectively. So even when the high frequency charger circuit 22 is shorted by deeply discharged battery, which means the PWM controller U1 and the bias power Va will lose one power path which is through winding W3, diode D5, resistor R4 and capacitor C8 and through winding W5, diode D6, resistor R26, diode D7 and capacitor C7 respectively, but they can still get power from another path and keep working correctly.

The operational amplifier U4A provides current limiting. In other words, during conditions when the battery is deeply discharged, the operational amplifier U4A exports a high signal to the opto-coupler U2 through the diode D10 and the resistor R14. If the charging current to the battery is more than the value set by microcontroller 32, the voltage FB pin of PWM controller U1 will reduce the PWM duty cycle, and the charging current is limited to the setting value.

As shown in FIG. 4A, the voltage Va is used to generate a 3.3 volt DC supply voltage for the microcontroller 32 (FIGS. 4B, 4C, 4E, and 4F). The voltage of the regular U3 is controlled by the resistors R53 and R56. In this case, the regulator U3 generates 3.3 volts, which is applied to the VDD input of the microcontroller 32 (FIGS. 4B, 4C, 4E, and 4F). The voltage Va, for example 15 volts DC, is applied to the emitter of a transistor Q6 (FIG. 4A). A bias resistor R26 is connected between the base and emitter of the transistor Q6. The transistor Q6 is under the control of a transistor Q11, which, in turn, is under the control of the microcontroller 32 (FIGS. 4B, 4C, 4E, and 4F) by way of a current limiting resistor R34 (FIG. 4A) and a load resistor R31. During normal operation, the LED display D3 and most of the LEDs (LED7-LED17) are off. To save energy consumption, the transistor Q11 and Q6 are turned off by microprocessor PC1, then the voltage regulator U3 is only connected to Va through resistor R27. Since the value of resistor R27, for example, 1 KΩ, is relatively high, it limits the current to the voltage regulator U3, in turn, saves energy consumption. When users want to turn on the LED display D3 and other LEDs, the switches SW3 or SW4 are depressed. The microprocessor PC1 needs more power from the 3.3V voltage regulator U3 to do so. If the 3.3V regulator U3 still only gets power from resistor R27, the power will be not enough to supply the microprocessor PC1 and other LEDs. When the microprocessor PC1 detects that the switches SW3 or SW4 are depressed, it turns on the transistor Q11 (FIGS. 4B, 4C, 4E, and 4F). The transistor Q11 (FIG. 4A), in turn, turns on the transistor Q6, thus connecting the voltage Va to the capacitor C7. Now the voltage Va is applied to an adjustable precision shunt regulator U3 not only by way of the resistor R27 but also by of a resistor R32 which value is much smaller than resistor R27. Thus the voltage regular U3 gets more power from Va to meet the need of more power to the microprocessor PC1 and the LEDs.

Flyback Transformer Construction.

As mentioned above, the flyback transformer T1 includes a pair bias windings W2 and W3, and bias winding W4. These windings are used to provide power to the microcontroller 32 as well as the PWM controller U1 during conditions when the battery voltage is relatively low, for example, 1.0 volts DC. As discussed below, the windings are identified as set forth below.

| Winding | Name | Type |
|---------|------|------|
| ½W1 | NP1 | Primary |
| W2 | NP3 | Primary/Bias |
| W3 | NP4 | Primary/Bias |
| W4 | NS1 | Secondary/Bias |
| W5 | NS2 | Secondary |
| ½W1 | NP2 | Primary |

Figure 8A:
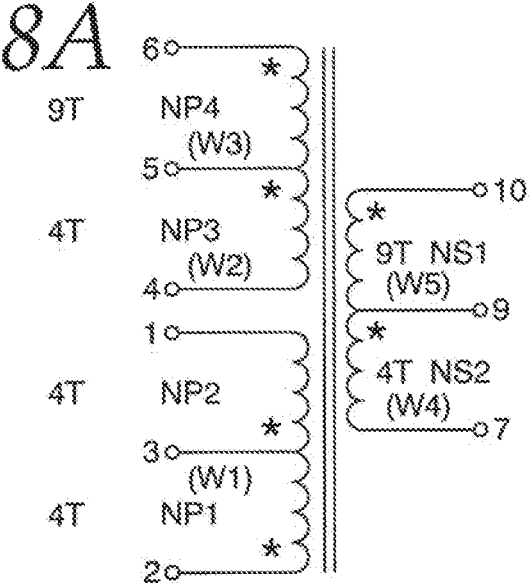
FIG. 8A is a schematic diagram of the flyback transformer that forms part of the present invention.
Figure 8B:
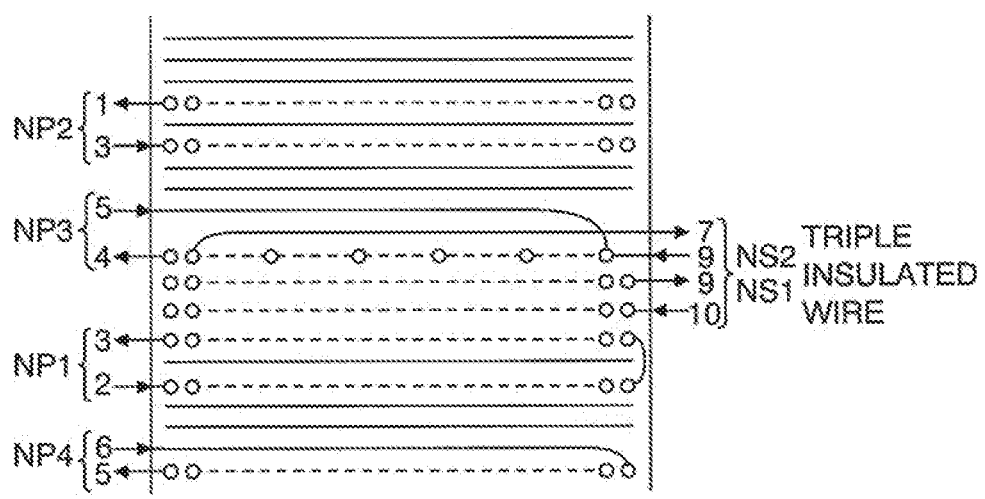
FIG. 8B is a wiring diagram of the flyback transformer that forms part of the present invention.

Exemplary construction drawings of the fly back transformer T1 are illustrated in FIGS. 8A and 8B. Referring first to FIG. 8A, the flyback transformer T1 may include two (2) primary windings NP1 and NP2, two bias windings NP3 and NP4 and two (2) secondary windings NS1 and NS2. The bias winding NP4 is wound on first at one end of the bobbin in multi-strands wire to cover the full winding width of the bobbin in one layer, thus this bias winding works as a shielding layer to improve EMC performance. In addition, the main primary winding is wound next and in opposite winding direction to this flyback bias winding NP4. It improves the EMC performance further. Since this bias winding NP4 is the one which most closest to the ferrite core of the transformer T1 and acts as a ECM shielding, it blocks the noise, created in the the primary winding W1, to reach the transformer core, in turn, reduces EMC noise. Further, the most noisy terminal 2 of the primary winding W1 is arranged to wound face to the most quiet terminal 5 which is connected to the ground PGND (FIG. 3B, 3C), this improves EMC performance further. All windings are wound with the polarities as shown in FIG. 8A. In this case, the primary winding W1 is split into two portions, NP1 and NP2, which will be explained in greater detail in the next section. In particular, one winding NP3 is connected with the same polarity as the primary winding W1 and the other winding NP4 is connected in the opposite polarity. Similarly, secondary winding NS2 is connected with the same polarity as the primary winding W1 and the other secondary bias winding NS2 is connected in the opposite polarity. This configuration allows the primary bias windings NP3 and NP4 and the secondary bias winding NS2 to supply sufficient voltage to the PWM controller U1 and the microcontroller respectively even if the battery voltage is low.

A winding diagram is shown in FIG. 8B illustrating an exemplary configuration of the windings on a bobbin. As shown, the primary winding W1 is split into two portions, NP1 and NP2. A secondary winding NS1 is sandwiched between the half primary winding NP1 and another half primary winding NP2. In this way, the leakage inductance between the primary winding W1 and the secondary winding NS1 is reduced largely, which, in turn, reduces the voltage spike to the FET Q1 when FET Q1 is turned off. An insulation tape may be disposed between the winding NP3 and the secondary windings NS1 and NS2. The secondary windings NS1 and NS2 are connected between the 9 and 10 and 9 and 7, respectively. An insulated tape is disposed between the primary winding NP1 and the bias winding NP4.

Magnet wire is used for the primary windings NP1 and NP2 and the bias windings NP3 and NP4. Triple insulated wire is used for the secondary windings NS1 and NS2. The specifications for the transformer T1 are set forth below.

Material List
Ferrite Core
Bobbin
Magnet Wire
Triple Insulated wire
Insulation Tape
Winding Specification
NP4: 9 turns of 4×#32 magnet wire (4×=4 wires in parallel), one layer, start 6 at far side→5.
NP1: 27 turns of 2×#29 magnet wire, two layers, start 2→3.
NS1: 9 turns of 2×#22 triple insulated wire, two layers, start 10→9.
NP2: 27 turns of 2×#29 wire, two layers, start 3→1
NS2: 4 turns of 1× triple insulated wire, one layer, spread out, start 9→7.
NP3: 4 turns of 1×#32 magnet wire on the same layer as NP3, start 5 (far side)→4.

Microcontroller Control.

The microcontroller 32 (FIGS. 4B, 4C, 4E, and 4F) may be a Model No. STM8S003K3T6 microcontroller, available from STMicroelectronics with 8 Kbytes of flash memory, 1 kilobyte of RAM and 128 bytes of EEPROM. The microcontroller 32 controls a three digit display D3 (FIG. 4C) by way of a plurality of transistors Q10, Q9 and Q7 and biasing resistors R33, R30 and R28, respectively. The transistors Q10, Q9 and Q7 are under the control of MUX signals MUX3, MUX2 and MUX1 which connect the anodes of the LEDs forming the display to a 3.3 volt DC. The cathodes of the LEDs forming the display are connected to the output ports are connected to the output ports PD7, PD6, PD5, PD4, PD3, PD2 and PD0 on the microcontroller 32 by way of the resistors R38, R39, R40, R41, R42, R43, R44 and R45, respectively. These output ports PD7, PD6, PD5, PD4, PD3, PD2 and PD0 control the operation of the LED display.

Figure 4D:
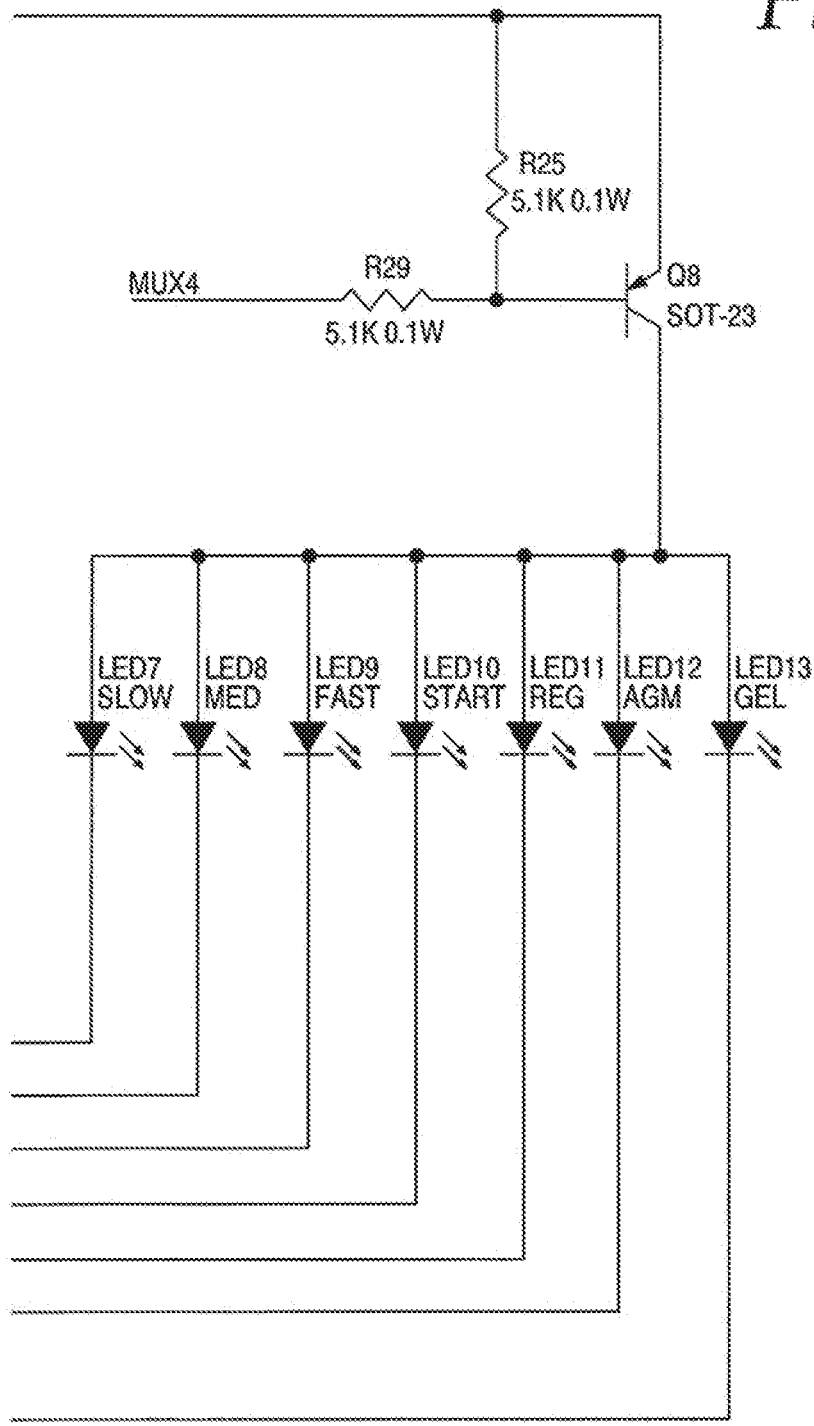
Figure 4E:
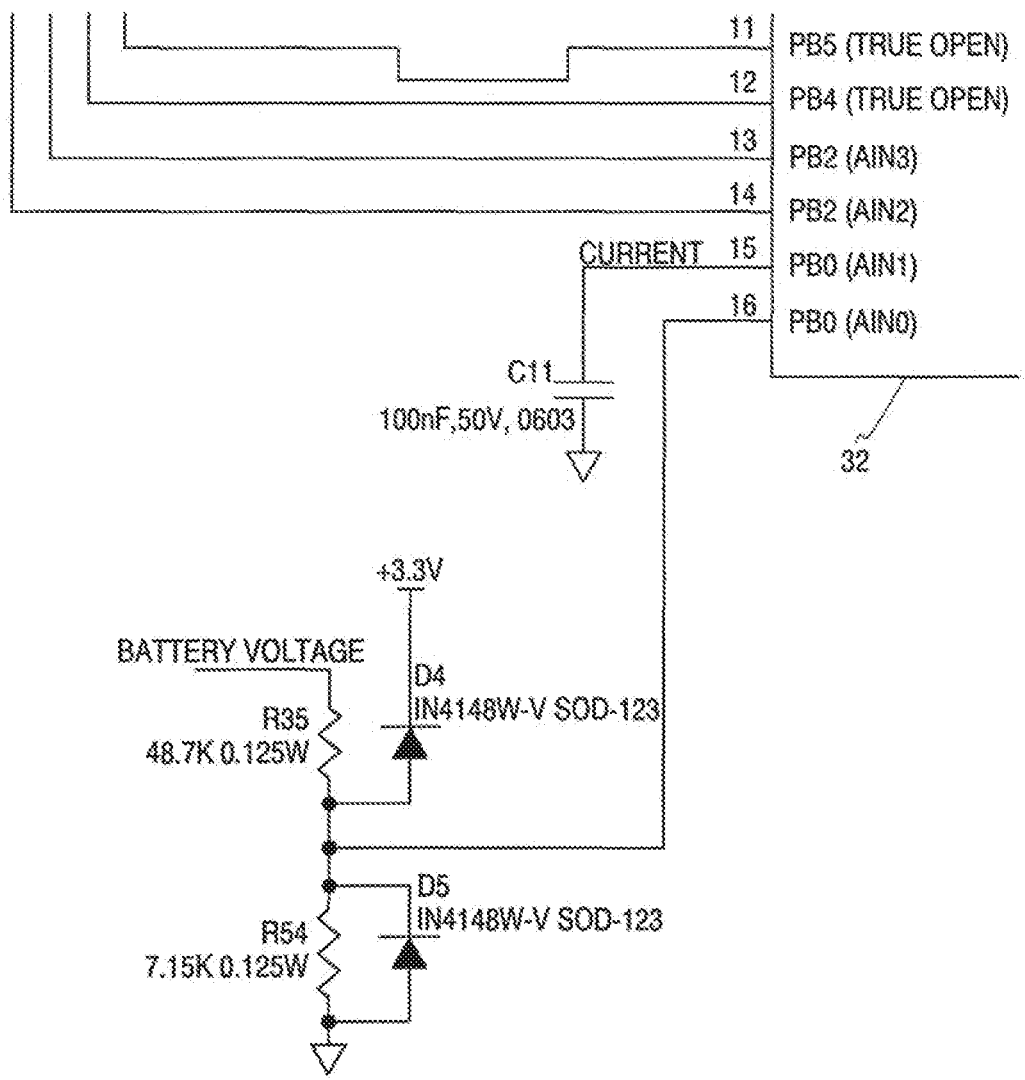
Figure 4F:
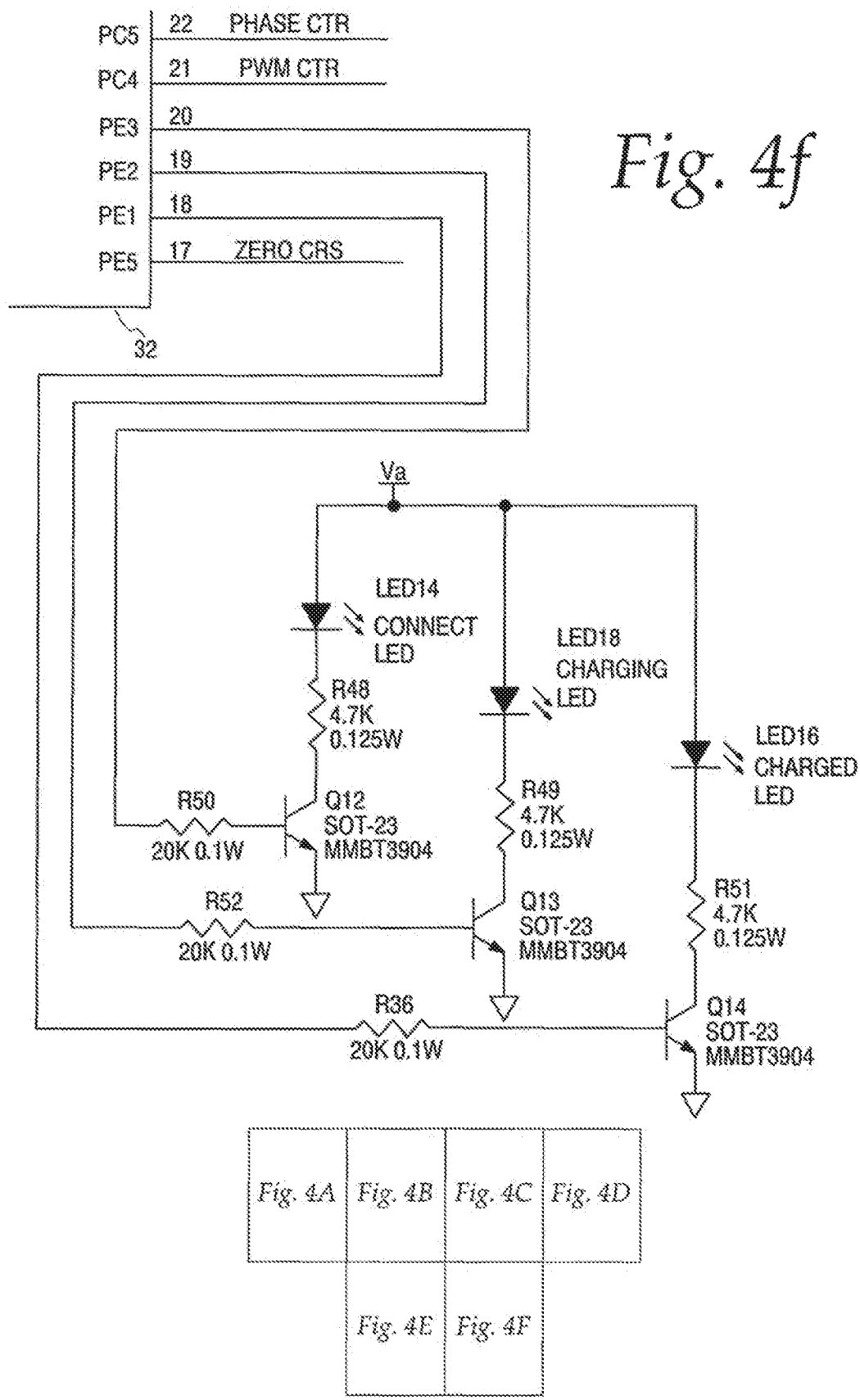
Figure 5:
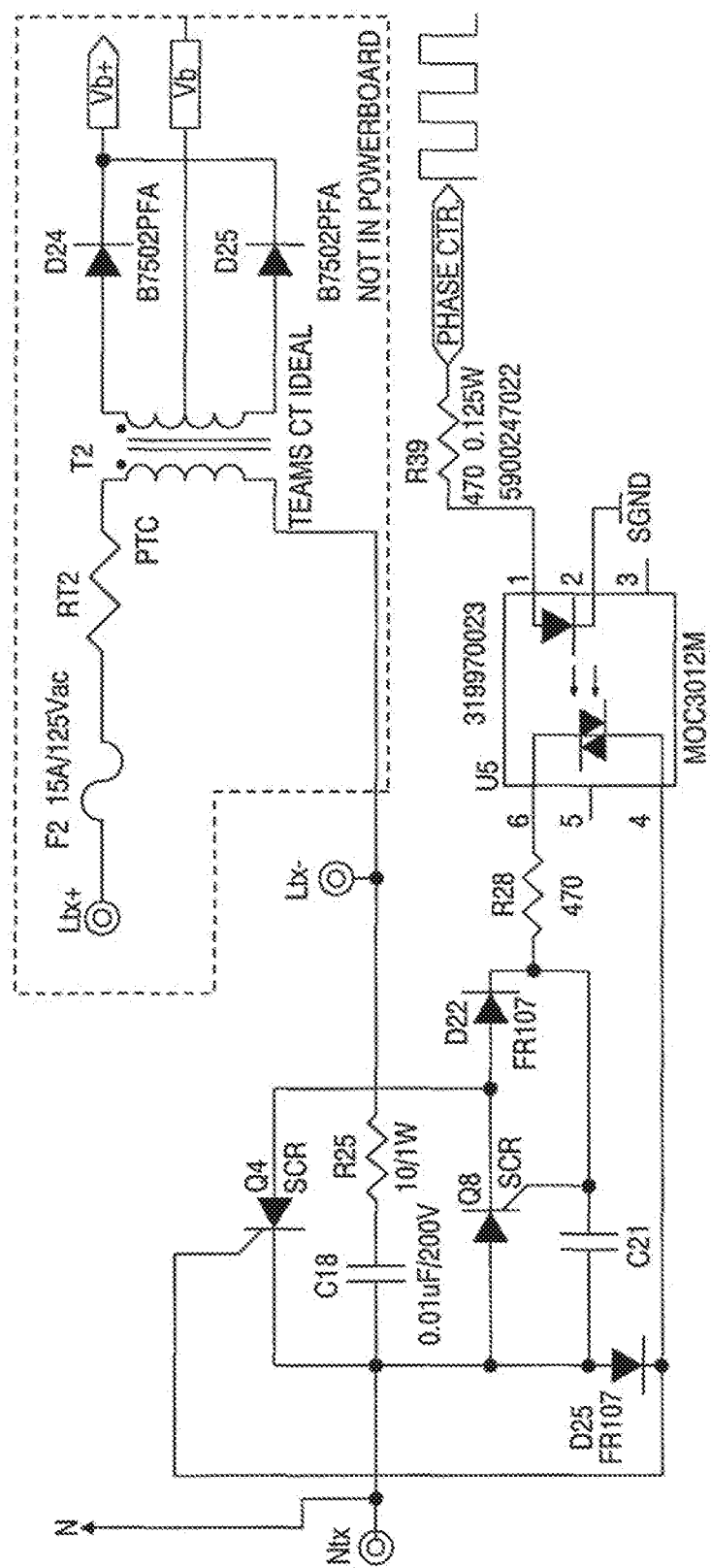
FIG. 5 illustrates an exemplary schematic diagram of an alternate embodiment of a linear charger circuit in accordance with the present invention that utilizes a pair of SCRs instead of a triac.

The microcontroller 32 also controls a number of LEDs as shown in FIG. 4D. For example, the microcontroller 32 controls the LEDs; LED7, LED8, LED9, LED10, LED11, LED12, and LED13 by way of a transistor Q8, a biasing resistor R25 and an input resistor R29. A MUX4 signal from the microcontroller 32 is applied to the input resistor R29 to connect a 3.3 volt DC voltage to the anode of the LED7, LED8, LED9, LED10, LED11, LED12, and LED13. The cathodes of the LED7, LED8, LED9, LED10, LED11, LED12, and LED13 are connected to the output ports PD7, PD6, PD5, PD4, PD3, PD2 and PD0 on the microcontroller 32 by way of the resistors R38, R39, R40, R41, R42, R43 and R44, respectively. These ports PD7, PD6, PD5, PD4, PD3, PD2 and PD0 control the operation of the LED7, LED8, LED9, LED10, LED11, LED12, and LED13.

The microcontroller 32 also controls the LEDs; LED14 (FIG. 4F) LED18, and LED16. These LEDs are connected to output ports PC3, PC2, and PC1 on the microcontroller by way of the transistors Q12, Q13 and Q14, load resistors R48, R49, and R51 and the input resistors R50, R52, and R36.

Similarly, the microcontroller 32 controls the LEDs; LED17 and LED15. A voltage of 3.3 volts DC is connected to the anodes of the LEDs, LED17 and LED15 by way of a pair of resistors R46 and R47, respectively. The cathodes of the LEDs, LED17 and the LED15 are applied to the output ports PB4 and PB5, respectively.

The microcontroller 32 also monitors various switches, such as the switches SW3 (FIG. 4A) and SW4. These switches SW3 and SW4 are connected between ground and the output ports PB3 (FIG. 4E) and PB2, respectively.

A scaled amount of the battery voltage is applied to an input port PB0 of the microcontroller 32. The battery voltage is scaled by a voltage divider formed from the resistors R35 and R54. A diode D4 is connected between the resistors R35 and R54 and 3.3 volts DC. A diode D5 is connected in parallel with the resistor R54. This analog voltage at the port PB0 is then converted to a digital value by an analog to digital converter onboard the microcontroller 32. When the scaled value of the battery voltage exceeds 3.3 volts, the diode D4 conducts so that the scaled voltage is clamped to 3.3 volts in order to protect the port PB0 from damage by over-voltage. The diode D5 is to protect the port PB0 from damage when a reversed polarity battery is connected to the charger circuit, it also protect the microprocessor from damage by a static electric discharge.

The ground pin VSS is connected to the reset pin NRST by way of a capacitor C8 and connected to digital ground. The reset is held in a high logic state by way of a 3.3 volt DC voltage and a pull-up resistor R37. The VDD pin is the digital power supply pin. A 3.3 volt DC voltage is applied to the VDD pin. A capacitor C9 connected between the VDD pin and the digital ground stabilizes the input voltage to the microcontroller 32. A capacitor C10 is connected between a regulator capacitor pin Vcap and digital ground. Programming of the microcontroller 32 is by way of the SWIM port PD1.

Output control signals generated by the microcontroller 32 are set forth in the table below.

| Signal Name | Port | Pin Number |
| --- | --- | --- |
| MUX3 | PA3 | 7 |
| MUX4 | PF4 | 8 |
| FAN Ctr | PB6 | 10 |
| Relay Ctr | PC6 | 23 |
| Phase Ctr. | PC5 | 22 |
| PWM Ctr. | PC4 | 21 |

Inputs to the microcontroller 32 are set forth in the table below.

| Signal Name | Port | Pin Number |
| --- | --- | --- |
| Current | PB1 | 15 |
| Zero Crs | PE5 | 17 |
| Battery Voltage | PB0 | 16 |

Connections between the microcontroller 32 (FIGS. 4B, 4C, 4E, and 4F) and the electronic circuitry are by way of 10 pin connectors CN1 (FIG. 3G) and CN2 (FIG. 4A).

The microcontroller 32 (FIGS. 4B, 4C, 4E, and 4F) has multiple low power modes. For example, the microcontroller 32 may have wait, active halt and halt low power modes as set forth below. For a STMicroelectronics, Model STM8S003K3T6 microcontroller, these modes are defined in their STM8S003K3/STM8S003F3 application data sheet, DOCID018576, Rev. 3:

Wait mode: In this mode, the CPU is stopped, but peripherals are kept running. The wakeup is performed by an internal or external interrupt or reset.

Active halt mode with regulator on: In this mode, the CPU and peripheral clocks are stopped. An internal wakeup is generated at programmable intervals by the auto wake up unit (AWU). The main voltage regulator is kept powered on, so current consumption is higher than in active halt mode with regulator off, but the wakeup time is faster. Wakeup is triggered by the internal AWU interrupt, external interrupt or reset.

Active halt mode with regulator off: This mode is the same as active halt with regulator on, except that the main voltage regulator is powered off, so the wake up time is slower.

Halt mode: In this mode the microcontroller uses the least power. The CPU and peripheral clocks are stopped, the main voltage regulator is powered off. Wakeup is triggered by external event or reset.

Another important feature is the ability to place the microcontroller 32 (FIGS. 4B, 4C, 4E, and 4F) in a halt or sleep mode. In this mode, the microcontroller 32 consumes the least amount of power. The microcontroller 32 can be woken up by applying a reset. This can be done by applying a signal to the NRST pin by way of the connector J2 (FIG. 4B). A switch press can be used to wake the microcontroller 32. Alternatively, a signal from an internal clock timer can be used.

The microcontroller 32 is programmed by a SWIM pin (FIG. 4C) on the microcontroller 32. The SWIM pin on the microcontroller 32 is connected to the SWIM pin 3 on the header J2.

Fan Control.

In order to provide cooling to the battery charger 20, a fan M2 (FIG. 3D) may be provided. The fan M2 may be a 12 volt DC fan connected to Vin and ground OGND by way of a transistor Q7. A Fan Ctr signal is applied to the input of the transistor Q7 by way of an input resistor R48. Anytime the Fan Ctr. signal is high, the fan M2 is turned on. A diode D20 is connected across the fan M2 to protect the transistor Q7 from the back EMF generated when the motor M2 is switched off by providing a current path through the diode D20 and the motor M2.

Software Control.

Figure 7A:
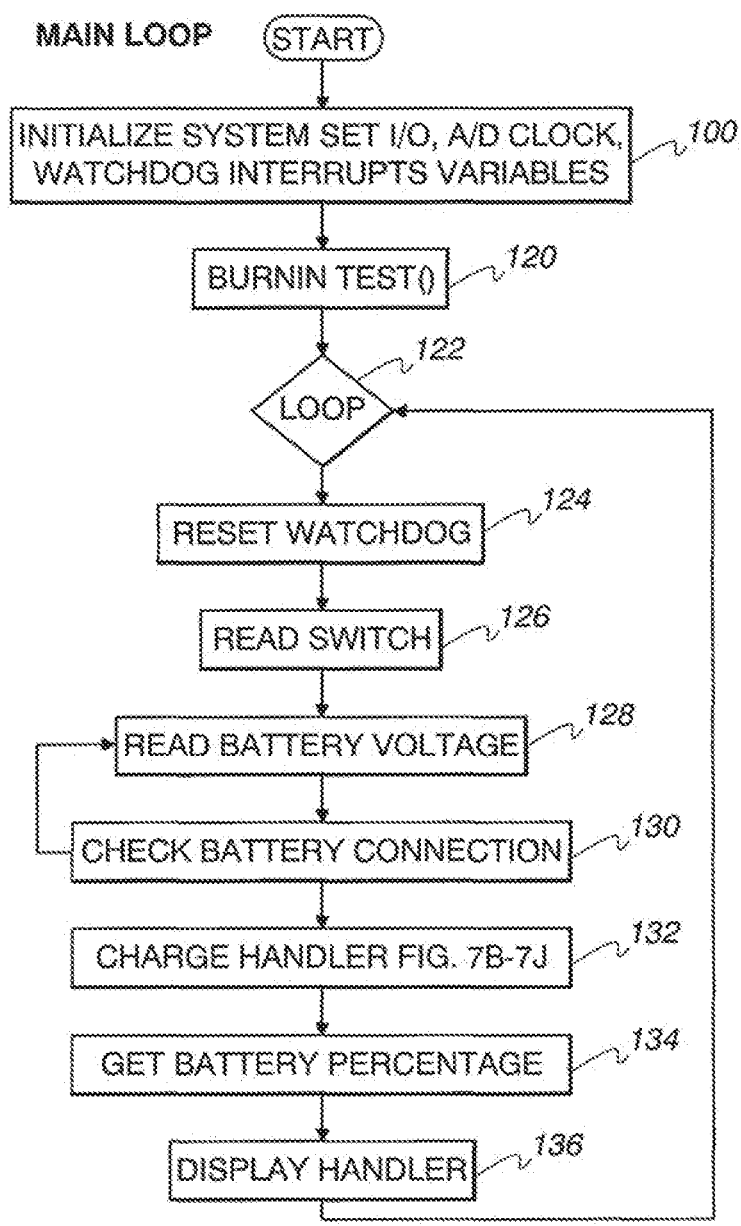

Exemplary software control diagrams are illustrated in FIGS. 7A-7L. The Main Loop is illustrated in FIG. 7A. Initialization of the hybrid charger 20 is illustrated by the block 100. On power-up of the hybrid charger 20, the system is initialized. Initialization includes setting input/output ports, initializing the analog/digital converters, initiating the clock and the watchdog timer and initializing interrupts and system variables. After initialization, a burn in test is conducted in step 120. The burn in test entails simulating a battery charge for a predetermined period of time, for example 20-30 minutes, in order to screen out problems not detected during a factory test.

After the burn in step, the system enters a loop 120 which includes the steps 120-136. These steps 120-136 are continuously repeated while a battery is being charged.

Figure 2B:
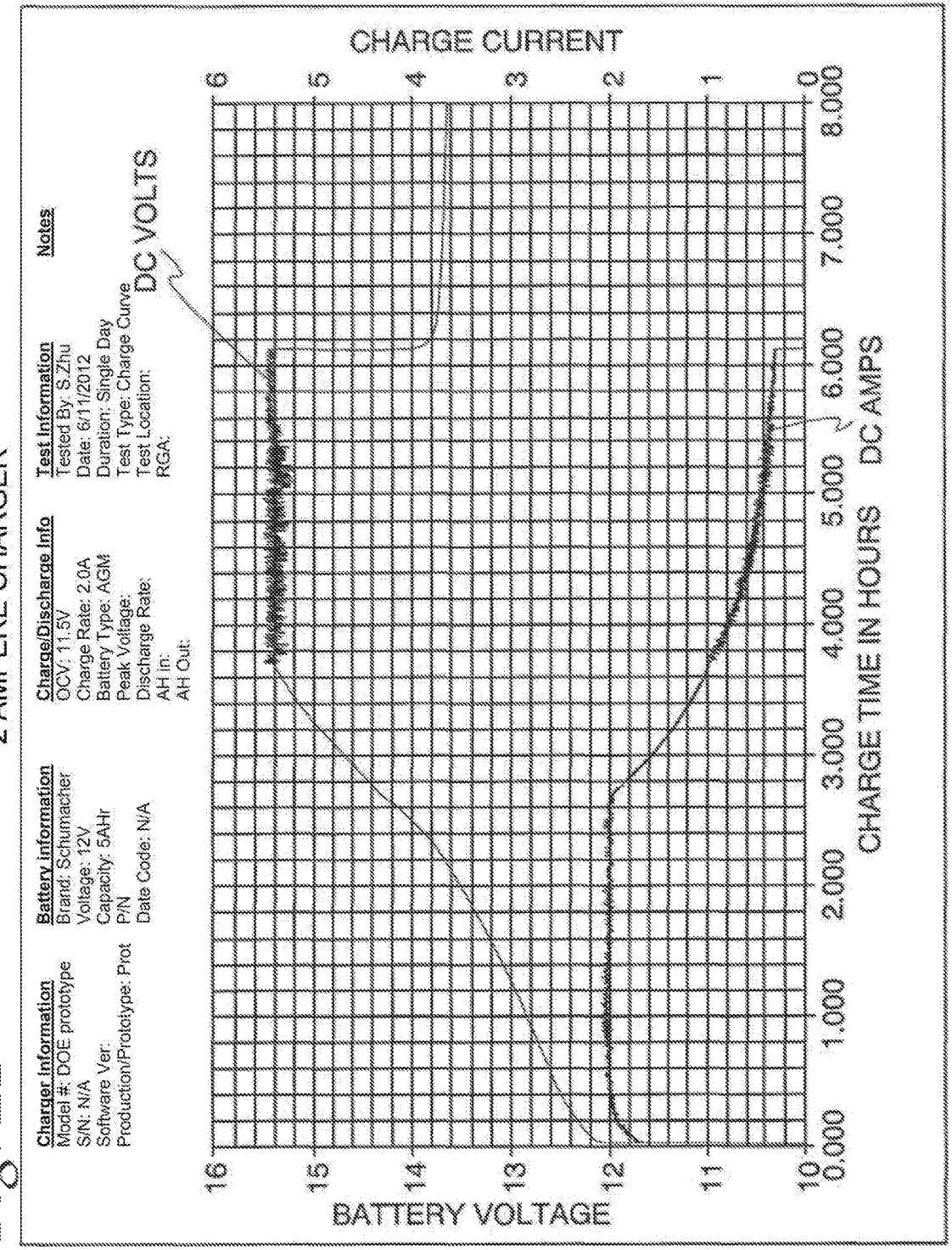
FIG. 2B is an exemplary charging curve for a 2.0 ampere battery charger.

Initially, the watchdog timer is reset in step 124. Next in step 126, the charge rate switch SW3 (FIG. 4) and the battery type switch SW4 are read by the microcontroller 32 to determine the selected battery type and the selected charge rate. Next in step 124, the battery voltage is read from port PB0. After the battery voltage is read in step 124, the system checks the battery connection in step 130. The battery connection is based on the battery voltage that is read in step 124. If the battery voltage is greater than a predetermined value, for example, 0.2 volts DC, the system assumes a battery is connected to the output terminals Vb+ and Vb− 25. If the voltage is less than 0.2 volts DC, the system assumes no battery is connected and the system loops back to step 124 and reads the battery voltage again. The system will loop between steps 128 and 130 until a voltage of at least 0.2 volts Dc is read. Once the system determines that a battery is connected to the output terminals Vb+ and Vb−, the system proceeds to the charge handler in step 132 and charges the battery. As indicated in the block 132, the charge handler is illustrated in FIGS. 7A-7J. After the charger handler routine is executed, the system determines in step 134 the status of the battery charging by measuring the battery voltage and charging current and comparing it with the values on the voltage and current nominal charging curves, for example, as illustrated in FIGS. 2 and 3 to determine the current point on those curves of the battery and using that point to determine the percentage complete of the battery charging. Once the battery charge percentage is determined, it is displayed on the display D3 (FIG. 4) in step 136 by a display handler, and the LED17 is illuminated to indicate a percentage complete of the battery charging is being displayed.

As mentioned above, the charge handler is illustrated in FIGS. 7A-7J. Referring initially to FIG. 7B, the charge handler is in an initial state. In the initial state INIT state, the triac Q4 (FIG. 3F or alternatively SCRs Q4 and Q8 (FIG. 5) are turned off. The LEDs, LED7-LED18 (FIG. 4), are turned off. The fan M2 is also turned off. The system then switches to a CHECK BATT state, as illustrated in FIG. 7B Turning to FIG. 7B, once the system enters the CHECK BATT state, the battery voltage is checked in step 140 to determine if it is greater than, for example, 0.2 volts DC. Each loop through the main loop, the battery voltage is measured during a predetermined time period, for example, 3 seconds. Thus, each loop through the main loop, a Total Charge Timer or 3 second timer is initialized. If the battery voltage is less than, for example, 0.2 volts DC, a 3 second timer is reset and the system exits indicating that no battery is attached. If the battery voltage is greater than 0.2 volts DC, the system assumes a battery is connected to the battery charger and illuminates the Connected LED 14. If the voltage is equal to or greater than, for example, 17.0 volts DC, as indicated by the block 144, the system assumes the battery is fully charges and resets the 3 second timer in step 142 and then exits and illuminates the Charged LED 16. Alternatively, if the battery voltage is less than 17.0 volts DC, the system checks in step 146 to determine if the 3 second timer has expired which indicates that a new loop through the main loop is to be initiated, If the 3 second timer has not expired, the system proceeds to step 148 and turns on the Charging LED 18 (FIG. 4), turns on the Fan M2 (FIG. 3) by way of the Fan Ctr. Signal, available at the PB6 port (FIG. 4) of the microcontroller 32. The battery voltage is saved as the variable Vorg. The system also clears the Total Charge Timer, i.e., 3 second timer and sets the appropriate charge as set by the switch SW3 (FIG. 4A).

Three different charge rates are selectable by the switch SW3, namely SLOW, MEDIUM and FAST charge rates as well as START, which refers to starting current. If a FAST charge rate is selected both the high frequency charger circuit 22 (FIG. 1) and the linear charger circuit 24, are connected in parallel to the output terminals 25. Assuming the linear charger circuit 24 can produce an exemplary 10 amps DC and the high frequency battery circuit can produce an exemplary 2 amps DC, a full 12 amps DC can be delivered to a battery in this mode, which incidentally defines the fourth mode of operation discussed above.

During this mode, the relay contact RLY1 is closed connecting the high frequency charger circuit 22 to the output terminals 25. In this mode, the microcontroller 32 provides a control signal "Relay Ctr." which controls a transistor Q5, which, in turn, controls the relay RLY1 so as to connect the linear charger circuit 24 to the output terminals 25 during this mode.

During a FAST charge rate or fourth mode of operation, the microcontroller 32 sends a "Phase Ctr." signal to the triac Q4 (FIG. 3F) or alternatively the SCRs Q4 and Q8 (FIG. 5) at the appropriate time to supply the proper charging current to the battery to be charged.

If a MEDIUM charge rate is selected by the switch SW3 (FIG. 4), only the linear charger circuit 24 is used to charge a battery connected to the output terminals 25. During this mode, identified above as the second mode, only the linear charger circuit 24 is connected to the output terminals 25. The high frequency charger circuit 22 is disconnected from the output terminals 25 by way of a relay contact RLY1 under the control of a relay RLY1, which, in turn is under the control of a transistor Q5. The transistor Q5, in turn is controlled by a signal "Relay Ctr." from the microcontroller 32. During this mode, the linear charger circuit 24 provides battery charging current to the battery to be charged, as mentioned above.

If a SLOW charge rate is selected, only the high frequency charger circuit 22 is connected to the output terminals 25 during this mode of operation, identified above as a third mode of operation. During this mode of operation, the triac Q4 (FIG. 3F) or alternatively the SCRs Q4 and Q8 (FIG. 5) are off disconnecting the linear charger circuit 24 from the output terminals 25, The relay contact RLY1 is closed in the manner discussed above, connecting the high frequency charger circuit 22 to the output terminals.

If a START rate is selected by the switch SW3, the linear charger circuit 24 is connected to the output terminals 25 in the manner mentioned above under the control of the microcontroller 32 (FIG. 1) to provide starting current, for example 75 amps DC. for a predetermined time, for example, 5 seconds, under the control of the microcontroller 32. During this mode the relay contact RLY1 may be open to disconnect the high frequency charger circuit 22 from the output terminals 25 during this mode.

Once the charge rate is selected, the system proceeds to the appropriate charge algorithm, as mentioned above, and the appropriate charge rate LED is illuminated. The LED7 corresponds to a slow charge rate. The LED8 corresponds to a medium charge rate while the LED9 corresponds to a fast charge rate. The LED10 corresponds to starting current.

Figure 7D:
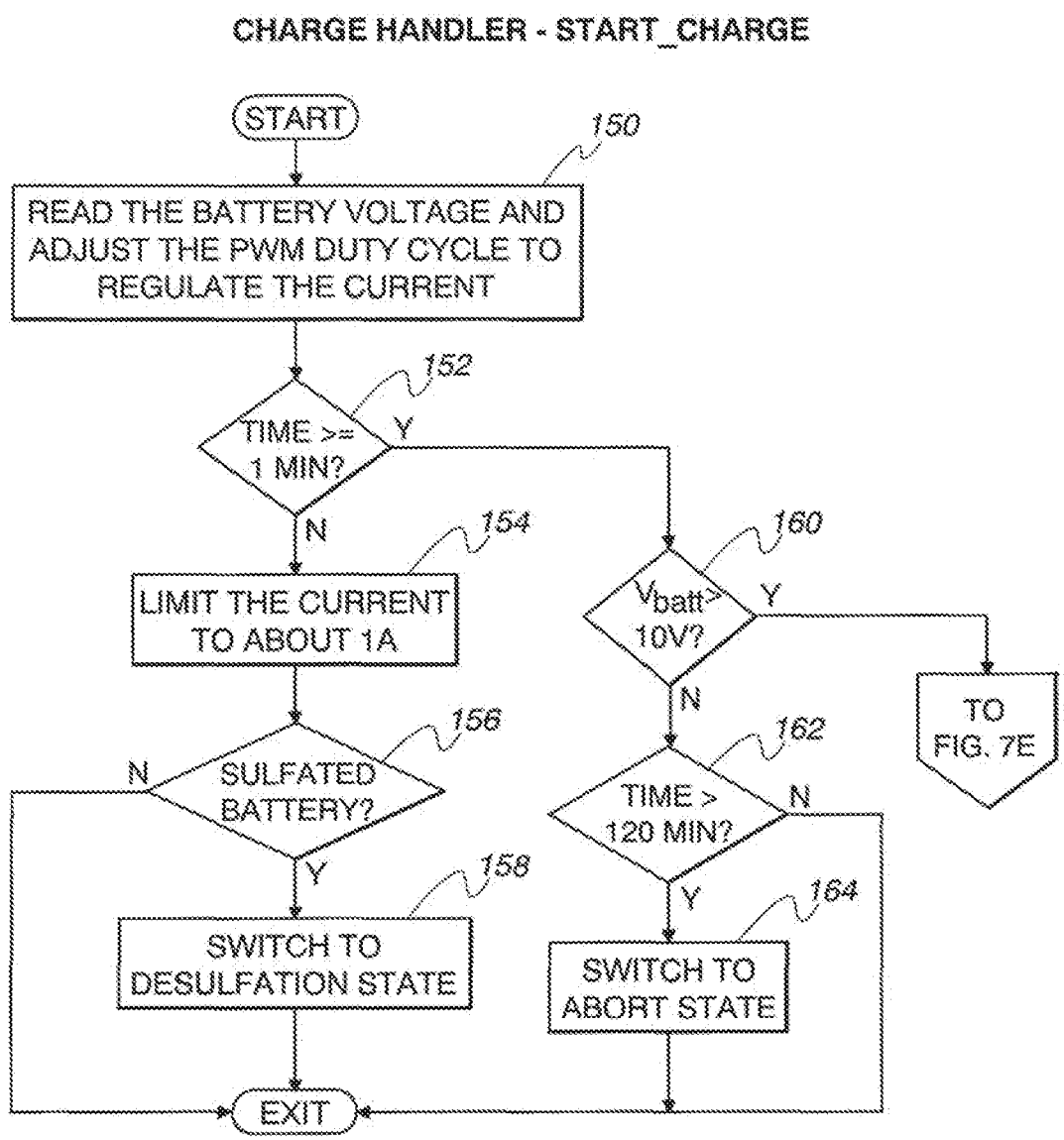

The system also checks the position of the switch SW4 with respect to the battery type. Depending on the position of the switch SW4, the LED corresponding to the selected battery type will be illuminated. The LED 12 corresponds to AGM batteries while the LED 13 applies to GEL batteries. The system then proceeds to the START CHARGE State, as illustrated in FIG. 7D.

In order to improve the overall efficiency of the hybrid charger, the linear charger circuit 24 and the high frequency charger circuit 22, the system takes advantage of the conditions in which these charger circuits are most efficient, for example, when one or more of the following exemplary conditions exist:

the charging current being drawn by the battery is above an exemplary predetermined value, for example, approximately 7 Amps DC;

the battery voltage is below a certain value, for example, 13.2 Volts DC; and the rate of change of voltage (dV/dt) is below a predetermined value, for example, approximately 0.1 V/hour.

During conditions when the linear charger circuit 24 is in use, either alone or in conjunction with the high frequency charger circuit 22, i.e., FAST and MEDIUM charge rate conditions, the system monitors various parameters, such as battery voltage, charging current and the rate of change of voltage with respect to time, dV/dt. If any of these parameters meet or exceed the values mentioned above, for example, the linear charger circuit 24 is switched off, as mentioned above, and charging is continued by the high frequency charger circuit 22 to improve the efficiency of the hybrid charger. Turning to FIG. 7D, for the selected charging rate, in step 150, the battery voltage is read and the PWM duty cycle to the linear charger 24 is read to regulate the charging current to the selected charging rate. Initially a first timer, for example, a 1 minute timer is initiated in step 152. During this minute, a constant charging current is applied to the battery and the system checks for a "sulfation" condition. Battery sulfation is known to occur when a battery will not accept a charge. As such, during the first minute, the battery charging current is limited to a relatively low value, for example, 1 amp DC. In step 154. After charging the battery at a constant current for a short time period, the system checks the battery voltage to determine if it has increased. If not, the system assumes the battery is sulfated in step 156 and switches to a Desulfation Mode in step 158 and exits. Alternatively, if the battery voltage increased during the low level charge, the system assumes the battery is not sulfated, the system exits. After the first timer times out, the system checks in step 160 whether the battery voltage is greater than a predetermined voltage, for example, 10 volts DC. If the battery voltage is less than the predetermined voltage. If not, the system checks a second timer, for example a 120 minute timer, in step 162 to determine if the battery was charged at the limited charging current and the second timer timed out and the battery voltage was still <10 volts DC. If so, the system proceeds to an ABORT state in step 164. If the second timer has not timed out, the system exits.

Figure 7E:
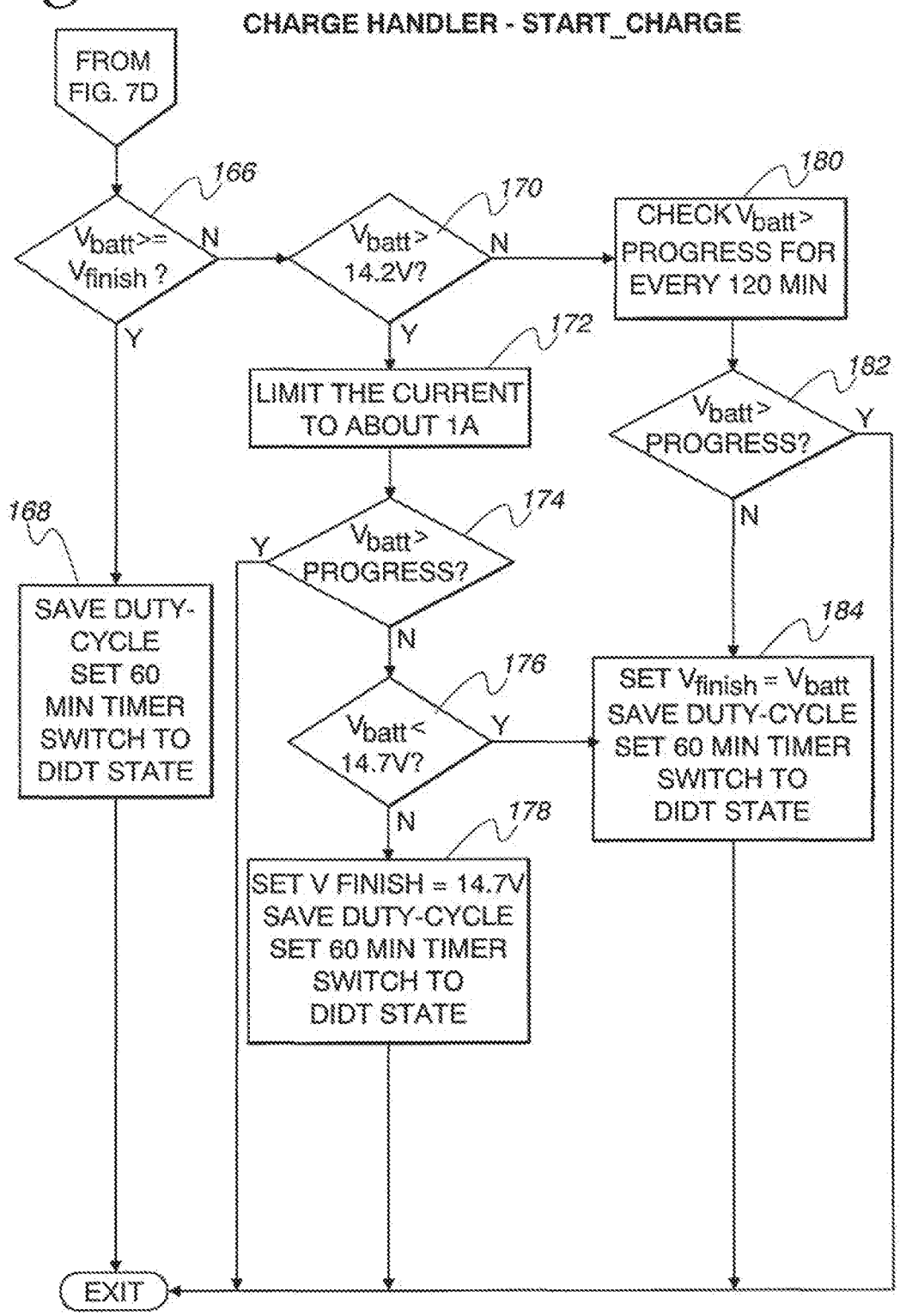

If in step 160, the battery voltage is determined to be >10 volts DC, the system proceeds to step 166 (FIG. 7E). In step 166, the system checks the battery voltage to determine if the battery voltage is at its nominal level. If so, the system proceeds to step 168. In step 168, the system saves the PWM duty cycle and sets a third timer, for example, a 60 minute timer, and switches from a constant current mode to a constant voltage mode. During a constant voltage mode, the system monitors the rate of change of the charging current dI/dt and proceeds to a dI/dt state.

Alternatively, if the system determines in step 166 that the battery voltage is not at its nominal value, $V_{fish}$, the system checks in step 170 whether the battery voltage is >a first predetermined value, for example, 14.2 volts. If the battery voltage is greater than the predetermined voltage, the battery voltage is checked at periodic intervals, for example, every 30 minutes in step 172. After every interval, the system checks whether the battery voltage has improved in step 174. If not, the system checks in step 176 whether the battery voltage has dropped below a second predetermined value, for example, 14.7 volts DC. If not, in step 178, the system sets the variable $V_{finish}$ to the predetermined value. The duty cycle is saved and the third timer is set. The system also switches to the dI/dt state, as illustrated in FIG. 7F.

If it is determined in step 170 that the battery voltage is less than the first predetermined value, e.g., 14.2 volts, the system checks the battery voltage at predetermined intervals, for example, every 120 minutes, in step 180. After every interval, the progress is checked in step 182. If there is progress, the system exits and proceeds to the dI/dt state. If there is no progress, the system proceeds to step 184, which is the same as step 178.

Figure 7F:
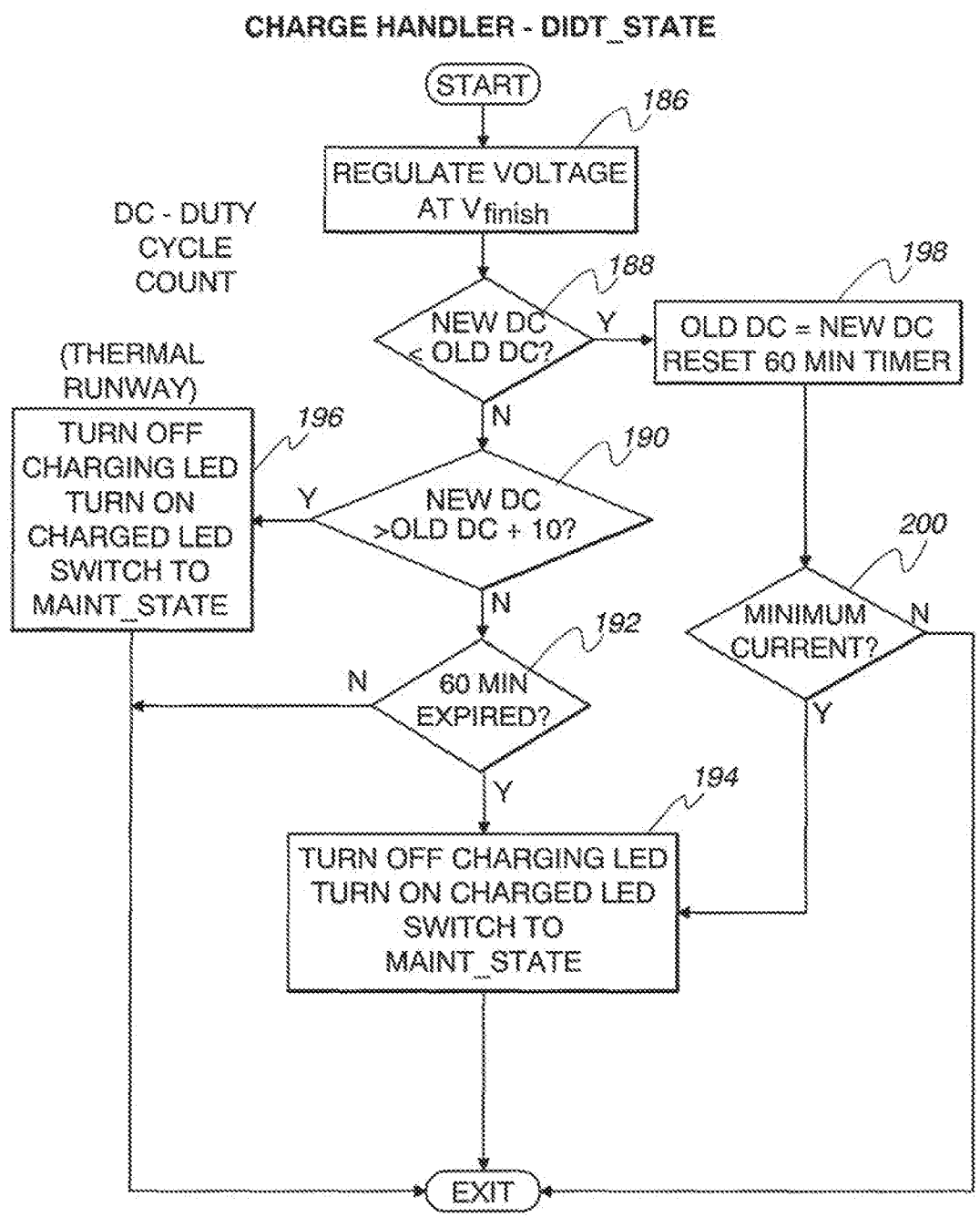

The dI/dt state is illustrated in FIG. 7F. Initially, in step 186, the battery voltage is regulated at $V_{finish}$. The dI/dt is determined by checking the pulse width of the charging current in order to regulate the battery voltage at $V_{finish}$. As such, the system checks in step 188 whether the new duty cycle (DC) is <the old duty cycle. If not, the system checks in step 190 whether the new duty cycle is >greater than the old duty cycle+a predetermined value, for example 10. If not, the system checks in step 192 whether the third timer, i.e., 30 minute timer, has timed out. If the system determines in step 192 that the third timer did not time out, the system exits and proceeds to the MAINT_State. If the third timer has timed out, the system proceeds to step 194. In step 194, the Charging LED18 (FIG. 4) is turned off and the Charged LED 16 is turned on. In addition, the system proceeds to the MAINT_State.

The duty cycle in the constant voltage mode is also used to determine a thermal runaway condition. In particular, if it is determined in step 190 that the new duty cycle is >the old duty cycle+the predetermined number, i.e., 10, the system assumes a thermal runaway condition in step 196. During this condition, the system turns off the Charging LED18 (FIG. 4) and turns on the Charged LED16. The system then proceeds to the MAINT_State.

In step 188, if the system determines the new duty cycle is less than the old duty cycle, the system sets old duty cycle variable Old DC equal to the new duty cycle variable New DC in step 198. The system proceeds to step 200 and checks the charging current. Exemplary charging curves are illustrated in FIGS. 2 and 3. As shown on these figures, the minimum charging current is about 0.4 amps DC. The system compares the charging current with the minimum known charging current to determine if the charging current is equal to or less than the minimum charging current. If the charging current is <than the known minimum charging current, the system assumes the battery is fully charged and proceeds to step 194. If the charging current is not <the minimum current, the system exits and proceeds to the MAINT_State.

The MAINT_State is illustrated in FIG. 7G. During this state the battery voltage is regulated at $V_{MAINT}$ in step 202 by applying a small maintenance charging current to the battery. In step 204, the system checks whether the maintenance charging current is greater than or equal to a predetermined value, for example, 1.0 amp DC. If not the system exits and proceeds to a MAINT2_state. If the charging current is greater than the predetermined value, the system proceeds to step 206. In step 206, the system initiates a fourth timer, for example, a 12 hour timer, and proceeds to the MAINT2_state.

The MAINT2_state is illustrated in FIG. 7H. In step 208, the system continues to regulate the battery voltage at $V_{MAINT}$ by applying a maintenance charging current. In step, 210, the system measures the charging current to determine if it is greater than or equal a predetermined value, for example, 1 amp DC. If the maintenance charging current is determined to be greater than or equal to the predetermined value, the system limits the maintenance charge current to the predetermined value, i.e., 1 amp DC. The system continues charging the battery at the limited maintenance charging current until the fourth timer, i.e., 12 hour timer, times out as determined in step 214. If the fourth timer has not timed out, the system exits and proceeds to the Desulfation state. If the fourth timer has timed out, the system proceeds to an Abort state in step 216.

Figure 7I:
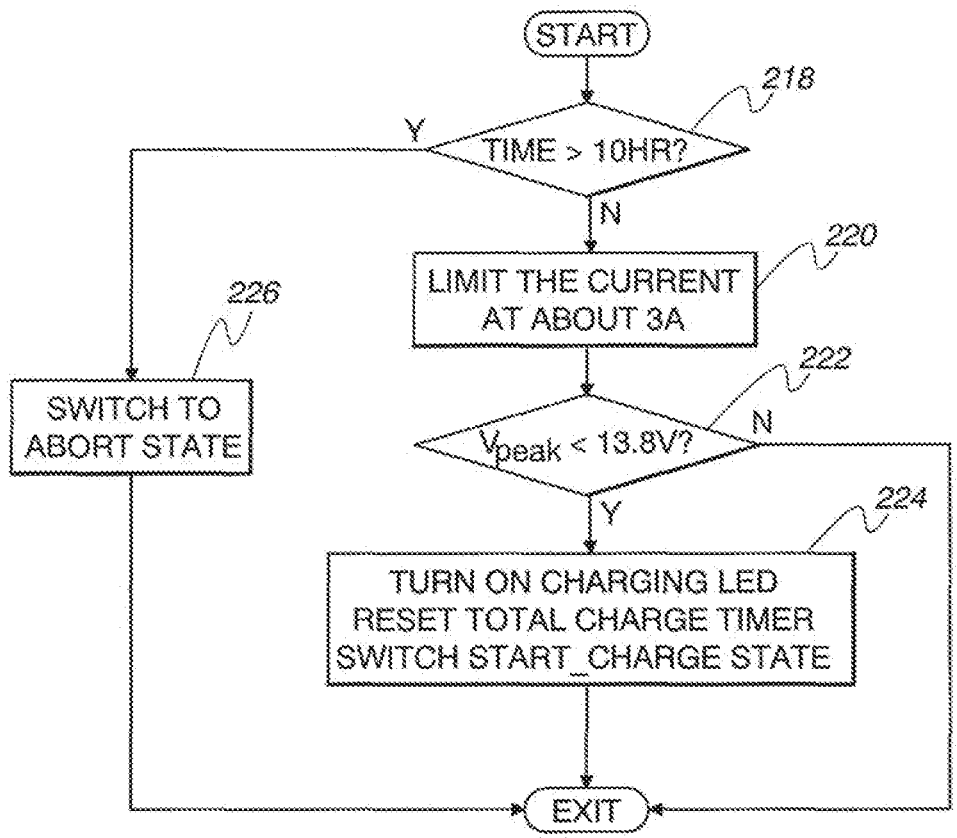

The Desulfation state is illustrated in FIG. 7I. Initially in step 218, the system checks the fourth timer to determine if more than 10 hours, for example, have elapsed. If more than 10 hours have elapsed, the system switches to the Abort state. If not more than 10 hours have elapsed, the charging current is limited to a second predetermined value, for example, 3 amps DC, in step 220. Next, the system checks whether the battery voltage is less than a predetermined value, for example, 13.8 volts DC. If the battery voltage is >than the predetermined value, the system exits and proceeds to the Abort State. Alternatively, if the battery voltage is <than the predetermined value, the system proceeds to step 224. In step 224, the Charging LED18 (FIG. 4) is turned off and the fourth timer, e.g., 12 hour timer is reset. The system returns to the Start Charge state, illustrated in FIGS. 7D and 7E.

Figure 7J:
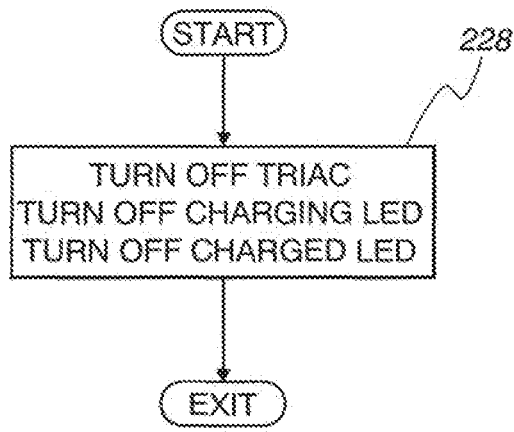

The Abort state is illustrated in FIG. 7J. In this state, the triac Q4 (FIG. 3) or alternatively, the SCRs Q4 and Q8 (FIG. 5) are turned off. In addition, the charging LED18 and the Charged LED16 are turned off.

Figure 7K:
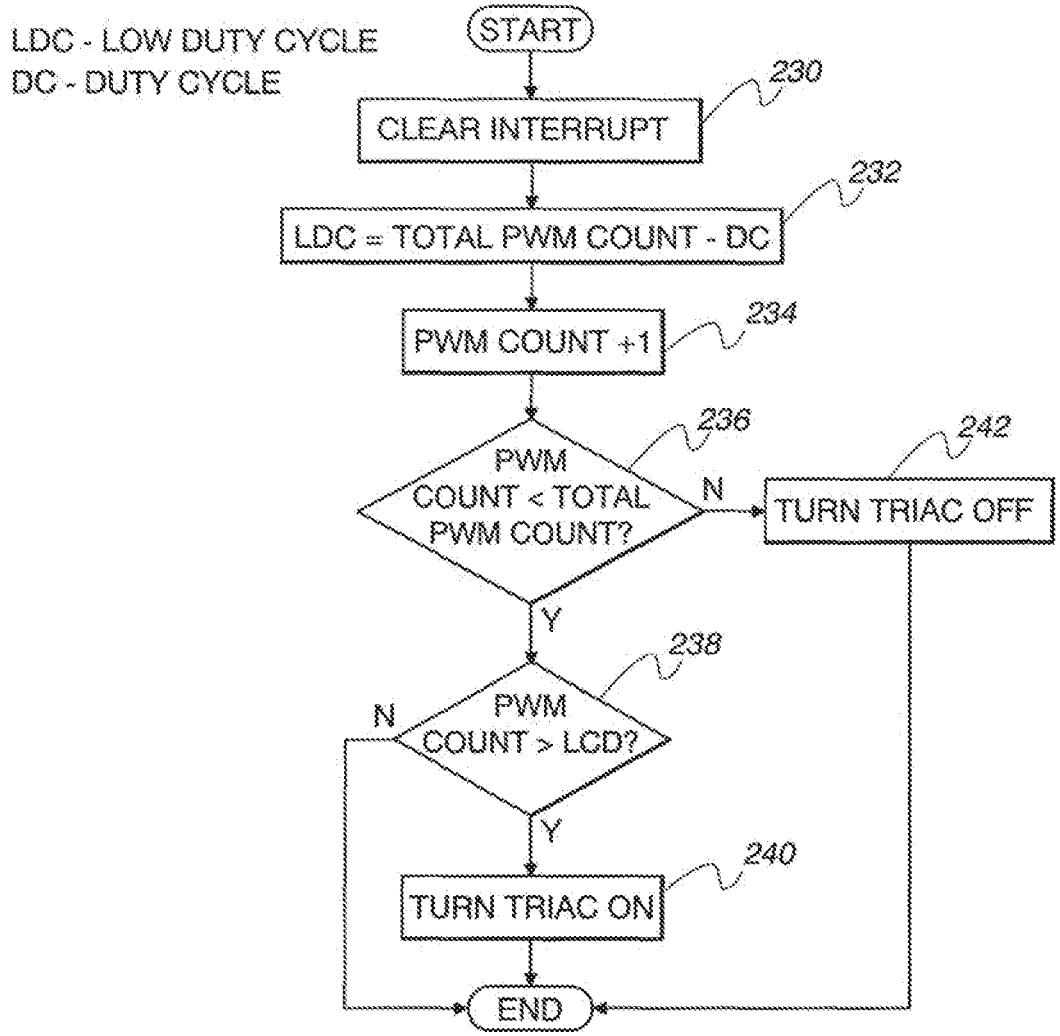

A timer interrupt service routine for the Phase Ctr. PWM (FIG. 3) is illustrated in FIG. 7K. The interrupt service routine is used to periodically determine the duty cycle of the charging current. Initially, all Phase Ctr. PWM interrupts are cleared in step 230.

The Phase Ctr. PWM interrupts are generated by the microcontroller 32 (FIGS. 4B, 4C, 4E, and 4F) in order to sense the duty cycle of the charging current. Assuming the linear charger 24 (FIG. 3F) is on, the duty cycle is obtained by the microcontroller 32 by measuring the pulse duration and the frequency of the charging current pulse train. The duty cycle is the ratio of the pulse duration to the pulse period. The pulse period is 1/pulse frequency. The duty cycle is determined in terms of a count or ticks of a timer.

In step 232, the variable Phase Ctr. PWM is set to be equal to the total Phase Ctr. PWM count minus the duty cycle, as measured. In step 234 the variable Phase Ctr. PWM count is incremented by 1. If the Phase Ctr. PWM count is not less than the total count, as determined in step 234, the system assumes the battery is charged and proceeds to step 242 and turns the triac Q4 (FIG. 3F) or the SCRs Q4 and Q8 (FIG. 5) off. Alternatively, if the Phase Ctr. PWM count is less than the total Phase Ctr. PWM count, the system proceeds to step 238 to determine if the Phase Ctr. PWM count is greater than the low duty cycle LDC, the system assumes the battery is not fully charged. As such, in step 240, the system turns on the triac Q4 (FIG. 3) or alternatively the SCRs Q4 and Q8 (FIG. 5).

Figure 7L:
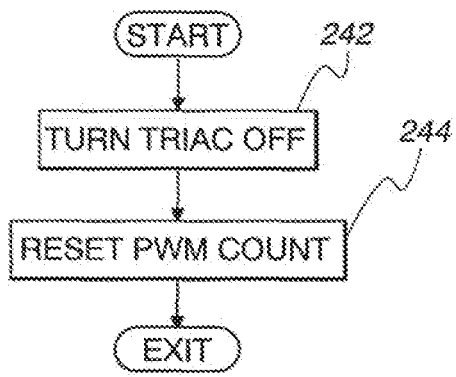

FIG. 7L illustrates the zero crossing interrupt service routine for controlling the triac Q4 (FIG. 3) or alternatively the SCRs Q4 and Q8 (FIG. 5), as discussed above. At every zero crossing the triac Q4 or alternatively the SCRs Q4 and Q8 are off, as indicated in step 242. The Phase Ctr. counter is then reset in step 244.

Obviously, many modifications and variations of the present invention are possible in light of the above teachings. Thus, it is to be understood that, within the scope of the appended claims, the invention may be practiced otherwise than as specifically described above.

What is claimed is:

1. A hybrid battery charger comprising:
a housing;
a set of output terminals configured to electrically couple with a battery;
a linear charger circuit positioned within said housing and configured to supply a first current to the battery via said set of output terminals during a first mode of operation;
a high frequency charger circuit positioned within said housing and configured to supply a second current to the battery via said set of output terminals during a second mode of operation,
wherein the linear charger circuit is electrically connected in parallel with the high frequency charger circuit between a power source and the set of output terminals via one or more switches;
a variable frequency drive circuit positioned within said housing and configured to control a frequency of the high frequency charger circuit between 20 kHz and 100 kHz; and
a microcontroller to selectively control said linear charger circuit and said high frequency charger circuit via the one or more switches during a charging cycle of the battery,
wherein the microcontroller is configured to switch the hybrid battery charger from the first mode of operation to the second mode of operation during the charging cycle when a battery voltage of the battery measured across the set of output terminals is above a voltage threshold, and
wherein the microcontroller is configured to switch the hybrid battery charger from the second mode of operation to the first mode of operation during the charging cycle when the battery voltage is not above the voltage threshold.

2. The hybrid battery charger of claim 1, wherein the variable frequency drive circuit is configured to control the frequency as a function of a load current at the set of output terminals.

3. The hybrid battery charger of claim 2, wherein the variable frequency drive circuit is configured to increase the frequency as the load current at the set of output terminals increases.

4. The hybrid battery charger of claim 1, wherein the high frequency charger circuit and the linear charger circuit supply the first current and the second current to the battery simultaneously via said set of output terminals during a third mode of operation.

5. The hybrid battery charger of claim 1, wherein the first mode of operation is either an engine-starting mode of operation or a charging mode of operation, and the second mode of operation is a maintenance mode of operation.

6. The hybrid battery charger of claim 1, wherein said high frequency charger circuit includes a flyback transformer to provide power to said microcontroller during a low voltage condition.

7. The hybrid battery charger of claim 1, wherein the high frequency charger circuit and the linear charger circuit supply the first current and the second current to the battery simultaneously via said set of output terminals when a desired charging current exceeds a maximum limit of the first current.

8. The hybrid battery charger of claim 1, wherein the one or more switches comprises a first switch operatively coupled to said microcontroller to selectively couple said linear charger circuit to the power source.

9. The hybrid battery charger of claim 8, wherein the one or more switches further comprises a second switch operatively coupled to said microcontroller to selectively couple said high frequency charger circuit to said set of output terminals.

10. The hybrid battery charger of claim 1, wherein the variable frequency drive circuit is configured to skip one or more switching cycles when a load current at the set of output terminals is (i) zero or (ii) not detected.

11. The hybrid battery charger of claim 8, wherein the microcontroller opens said first switch when said linear charger circuit is not charging the battery, thereby prohibiting supply of power from the power source to the linear charger circuit.

12. The hybrid battery charger of claim 1, wherein the microcontroller is configured to enter a sleep mode during a maintenance mode of operation.

13. The hybrid battery charger of claim 12, wherein the high frequency charger circuit is configured to regulate its output voltage to a predetermined maintenance voltage in response to an analog signal.

14. The hybrid battery charger of claim 12, wherein the microcontroller is configured to exit the sleep mode when the battery is disconnected from the set of output terminals.

15. The hybrid battery charger of claim 1, wherein said high frequency charger circuit includes a flyback transformer and said microcontroller includes a set of bias windings on a primary and a secondary of said transformer configured to provide power to a pulse-width modulation (PWM) controller and the microcontroller during a low voltage condition.

16. A hybrid battery charger for charging a battery, the hybrid battery charger comprising:
   a housing having a display device positioned thereon, wherein the display device is configured to indicate a status of the battery;
   a set of output terminals configured to electrically couple with the battery;
   a linear charger circuit positioned within said housing to supply a first current to the battery via said set of output terminals during a charging mode of operation;
   a high frequency charger circuit positioned within said housing to supply a second current to the battery via said set of output terminals during a maintenance mode of operation, wherein said high frequency charger circuit includes a flyback transformer, wherein the linear charger circuit is electrically connected in parallel with the high frequency charger circuit between a power source and the set of output terminals via one or more switches; and
   a microcontroller to selectively control said linear charger circuit and said high frequency charger circuit in accordance with said charging mode of operation or said maintenance mode of operation during a charging cycle;
   wherein the microcontroller is configured to switch the hybrid battery charger from the charging mode of operation to the maintenance mode of operation via the one or more switches during the charging cycle of the battery when a battery voltage of the battery measured across the set of output terminals is above a voltage threshold, and
   wherein the microcontroller is configured to enter a sleep mode during a maintenance mode of operation and to exit the sleep mode when the battery is disconnected from the set of output terminals.

17. The hybrid battery charger of claim 16, further comprising a variable frequency drive circuit positioned within said housing and configured to control a frequency of the high frequency charger circuit.

18. The hybrid battery charger of claim 16, wherein the microcontroller is configured to control the high frequency charger circuit and the linear charger circuit to supply the first current and the second current to the battery simultaneously via said set of output terminals.

19. The hybrid battery charger of claim 16, wherein the display device is configured to indicate a charge percentage of the battery.

20. A hybrid battery charger comprising:
   a housing;
   a set of output terminals configured to electrically couple with a battery;
   a linear charger circuit positioned within said housing and configured to supply a first current to the battery via said set of output terminals during a first mode of operation;
   a high frequency charger circuit positioned within said housing and configured to supply a second current to the battery via said set of output terminals during a second mode of operation,
   wherein the linear charger circuit is electrically connected in parallel with the high frequency charger circuit between a power source and the set of output terminals via one or more switches;
   a variable frequency drive circuit positioned within said housing and configured to control a frequency of the high frequency charger circuit; and
   a microcontroller to selectively control said linear charger circuit and said high frequency charger circuit via the one or more switches during a charging cycle of the battery,
   wherein the one or more switches comprises a first switch configured to electrically couple said linear charger circuit to the power source and a second switch configured to electrically couple said high frequency charger circuit to said set of output terminal, and
   wherein the microcontroller is configured to switch the hybrid battery charger from the first mode of operation to the second mode of operation during the charging cycle when a charging current into the battery drops below a current threshold.

21. A hybrid battery charger comprising:
   a housing;
   a set of output terminals configured to electrically couple with a battery;
   a linear charger circuit positioned within said housing and configured to supply a first current to the battery via said set of output terminals during a first mode of operation;
   a high frequency charger circuit positioned within said housing and configured to supply a second current to the battery via said set of output terminals during a second mode of operation,
   wherein the linear charger circuit is electrically connected in parallel with the high frequency charger circuit between a power source and the set of output terminals via one or more switches;
   a variable frequency drive circuit positioned within said housing and configured to control the high frequency charger circuit at a frequency that is greater than 20 kHz, wherein the variable frequency drive circuit is configured to skip one or more switching cycles when a load current at the set of output terminals is (i) zero or (ii) not detected; and a microcontroller to selectively control said linear charger circuit and said high frequency charger circuit via the one or more switches during a charging cycle of the battery, wherein the microcontroller is configured to switch the hybrid battery charger from the first mode of operation to the second mode of operation during the charging cycle when a battery voltage of the battery measured across the set of output terminals is above a voltage threshold.

* * * * *